(12) United States Patent  (10) Patent No.: US 7,526,547 B2
Rodrigo  (45) Date of Patent: Apr. 28, 2009

(54) INTELLIGENT NETWORK CHARGING EDGE

(75) Inventor: Anthony Rodrigo, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 316 days.

(21) Appl. No.: 09/976,876

(22) Filed: Oct. 12, 2001

(65) Prior Publication Data

US 2003/0074286 A1  Apr. 17, 2003

(51) Int. Cl.
    *G06F 15/173* (2006.01)
(52) U.S. Cl. .................... 709/225; 709/229
(58) Field of Classification Search ............... 709/223, 709/225, 227, 229; 705/32
    See application file for complete search history.

(56) References Cited

U.S. PATENT DOCUMENTS

| | | | |
|---|---|---|---|
| 5,113,430 A * | 5/1992 | Richardson et al. ...... | 379/88.17 |
| 5,581,607 A * | 12/1996 | Richardson et al. ...... | 379/88.22 |
| 5,835,572 A | 11/1998 | Richardson, Jr. et al. | |
| 5,973,722 A | 10/1999 | Wakai et al. | |
| 6,031,895 A * | 2/2000 | Cohn et al. ............. | 379/88.13 |
| 6,047,051 A * | 4/2000 | Ginzboorg et al. ......... | 379/130 |
| 6,269,399 B1 | 7/2001 | Dyson et al. | |
| 6,515,968 B1 | 2/2003 | Combar et al. | |
| 6,625,266 B1 | 9/2003 | Saari et al. | |
| 6,760,417 B1 | 7/2004 | Wallenius | |

FOREIGN PATENT DOCUMENTS

| | | |
|---|---|---|
| GB | 2375260 | 6/1992 |
| WO | WO 99/27556 | 6/1999 |
| WO | WO 00/28746 | 5/2000 |
| WO | WO02/067156 | 8/2002 |

\* cited by examiner

*Primary Examiner*—Andrew Joseph Rudy
(74) *Attorney, Agent, or Firm*—Hollingsworth & Funk, LLC

(57) ABSTRACT

A system and method for managing charging and billing for services on a network, where the network includes network elements that provide billable services, and charging elements that perform various charging and billing functions. Charging event are received at a network charging edge that isolates the network elements and charging elements. The network charging edge includes one or more bridge modules that are logically coupled between the network elements and the charging elements. Charging transactions between the network elements and their respective charging elements are managed via the bridge modules, by applying rules to the charging transaction initiated by corresponding charging events.

58 Claims, 13 Drawing Sheets

INTELLIGENT NETWORK CHARGING EDGE

FIELD OF THE INVENTION

The present invention relates generally to network communications systems, and more particularly, to a system and method for mediating charging transactions between service-providing network elements and charging/billing network elements.

BACKGROUND OF THE INVENTION

Technological advances in networking systems continue to facilitate ease of information transfer and convenience to users. The proliferation of local, regional, and global networks such as the Internet has availed a sea of information to the consuming public. These networking technologies have expanded to increasingly include wireless and mobile technologies. Information can be downloaded to desktop systems, wireless systems, mobile systems, etc. through a variety of interconnected networks. For example, information available via the Internet can be downloaded onto mobile wireless units, such as cellular telephones, personal digital assistants (PDAs), laptop computers, etc.

Through the introduction of current and future access technologies such as General Packet Radio Service (GPRS), Universal Mobile Telecommunications System (UMTS), Wireless Application Protocol (WAP), etc., data subscribers will experience and use an unprecedented variety of new services based on the subscriber's location, selected content, and personal preferences. In this arena operators and service providers compete to offer differentiated service variety and pricing. As new services are rolled out, the time-to-market issue affecting these competitive new services becomes a paramount concern, and delays due to integration requirements with charging and billing systems becomes increasingly intolerable.

Network elements related to charging, billing, rating, etc. (hereinafter generally referred to as charging elements) can be complex. For example, rating engines are often required to handle a very large number of permutations resulting from factors such as rating multiple services, each which includes a great number of flexible pricing and discounting variables. Charging elements may be based on different pricing options, such as postpaid, direct pay, prepaid or other real-time payment options. Further, charging can be based on a combination of data volume, duration, type of content, transaction, etc. All of these different variables make charging elements, and communicating with such charging elements, quite complex.

In a conventional billing system, each of the services communicates charging/billing information, such as call-detail records (CDRs), to the charging elements. However, each of the various network elements may collect and provide CDR information in different formats. The charging elements need to know the format used by each particular network element in order to comprehend its content. This fact, coupled with the complexities of charging elements described above, typically requires that an "integration" be performed for each network element handled by the charging elements. More particularly, the charging and billing elements must undergo an integration to allow it to understand and communicate with each of the network elements in which it is to collect and process charging and billing information. These custom modifications at the charging elements present a significant task, requiring colossal amounts of time and money, and have a major adverse impact on getting a new service to market quickly. The problem of requiring such integration is exacerbated as new services and network elements continue to be designed and deployed in the network.

Furthermore, charging for network services can be based on postpaid, prepaid, direct pay, and other real-time or non-real-time payment methodologies. As new network systems are presented in the networks, these various payment approaches add significant complexities to existing charging and billing methodologies. For example, as more and more real-time interaction is required between networks and Operations Support Systems (OSS) systems, custom solutions must continually be derived. There is currently no manner of facilitating the integration of these new systems into existing networks in an expeditious and effective manner.

Therefore, the challenge still remains to expedite the interfacing of services and charging elements, and reduce the resulting interface complexities in these network elements. The present invention provides a solution to these and other shortcomings of the prior art, and offers additional advantages over the prior art.

SUMMARY OF THE INVENTION

The present invention is directed to a system and method for mediating charging transactions between service-providing network elements and charging/billing network elements.

In accordance with one embodiment of the invention, a method is provided for managing charging and billing for services on a network, where the network includes network elements that provide billable services and charging elements that perform various charging and billing functions. Charging event records, herein referred to as charging events, are received at a network charging edge that isolates the network elements and charging elements. The network charging edge includes one or more bridge modules that are logically coupled between the network elements and the charging elements. Charging transactions between the network elements and their respective charging elements are managed via the bridge modules, by applying rules to the charging transaction initiated by corresponding charging events.

More particular features of such a method include implementing an application programming interface (API) at each of the network elements to interface each of the respective network elements to the bridge modules. Further, managing the charging transactions may include transforming the charging events to a format recognizable by targeted charging elements, pursuant to the rules. The rules also govern selection of an interface object for communicating with a corresponding charging element. This selection of an interface object includes identifying one of the multiple interface objects as determined by object configuration rules. In one embodiment, each of the bridge modules is pre-configured with the requisite rules. This configuration process includes configuring each of the bridge modules with a subset of the rules assigned to the services managed by that bridge module. One of the bridge modules may be assigned as a primary bridge module that receives all of the rules for all of the bridge modules. The primary bridge then distributes the rule subsets to the remaining bridge modules. Such a rule configuration may be effected through entry of the rules at a console coupled to the primary bridge module.

In accordance with another embodiment of the invention, a system for facilitating charging for services available via a network is provided. At least one network charging element is provided in the network to perform service charging functions. Further, at least one network service element provides a service subject to use charges. A network charging edge, including at least one charging bridge logically coupled between the network service element and the network charging element, mediates communications between the network service element and the network charging element.

In accordance with another embodiment of the invention, a bridging apparatus is provided for mediating charging transactions between at least one network service element and at least one network charging element on a network. The bridging apparatus includes a transformation module to receive a charging event from the network service element, and to transform the charging event to a format comprehensible by the network charging element. A business rule module is coupled to the transformation module to provide predefined business rules that govern transformations performed by the transformation module. An interface object module is provided, which includes a various interface objects for communicating with corresponding network charging elements. An interface object management module is coupled to the transformation module to receive the transformed charging events. An object configuration rule module is coupled to the interface object management module, and includes object configuration rules to instruct the interface object management module to direct the transformed charging events to the interface objects of the charging elements for which the transformed charging events are destined.

In accordance with another embodiment of the invention, a method is provided for managing charging and billing for services on a network having network elements providing billable services and charging elements. The method includes receiving multiple charging information records generated by multiple network elements at a network charging edge. The various charging information records are associated with a particular user session that involves each of a number of the multiple network elements. The charging information records are coordinated into a user-session charging transaction at one or more bridge modules of the network charging edge, which is logically coupled between the plurality of network elements and the charging elements. Coordinating the charging information records into a user-session charging transaction is governed by first predetermined rules applied at the bridge modules. The user-session charging transaction is executed at the bridge modules according to second predetermined rules.

The above summary of the present invention is not intended to describe each illustrated embodiment or implementation of the present invention. This is the purpose of the figures and the associated discussion which follows.

DETAILED DESCRIPTION OF THE ILLUSTRATED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Generally, the present invention is directed to a system and method for interfacing network elements and charging/billing elements in a network, using a network layer serving as a charging edge. Charging events, such as "call-detail records" (CDRs), are provided by network element services. These charging events are directed to an intermediary network charging layer which isolates the network elements from the charging and billing elements. Within the network charging layer are one or more bridge systems that isolate the network elements and the Operations Support Systems (OSS) charging and billing elements. The bridge systems provide intelligence at the network charging layer, thereby allowing the network elements to focus on providing services, and the charging and billing elements to focus on charging and billing. This bridge intelligence involves coordination and management of the transactions arising out of charging event occurrences.

Figure 1:
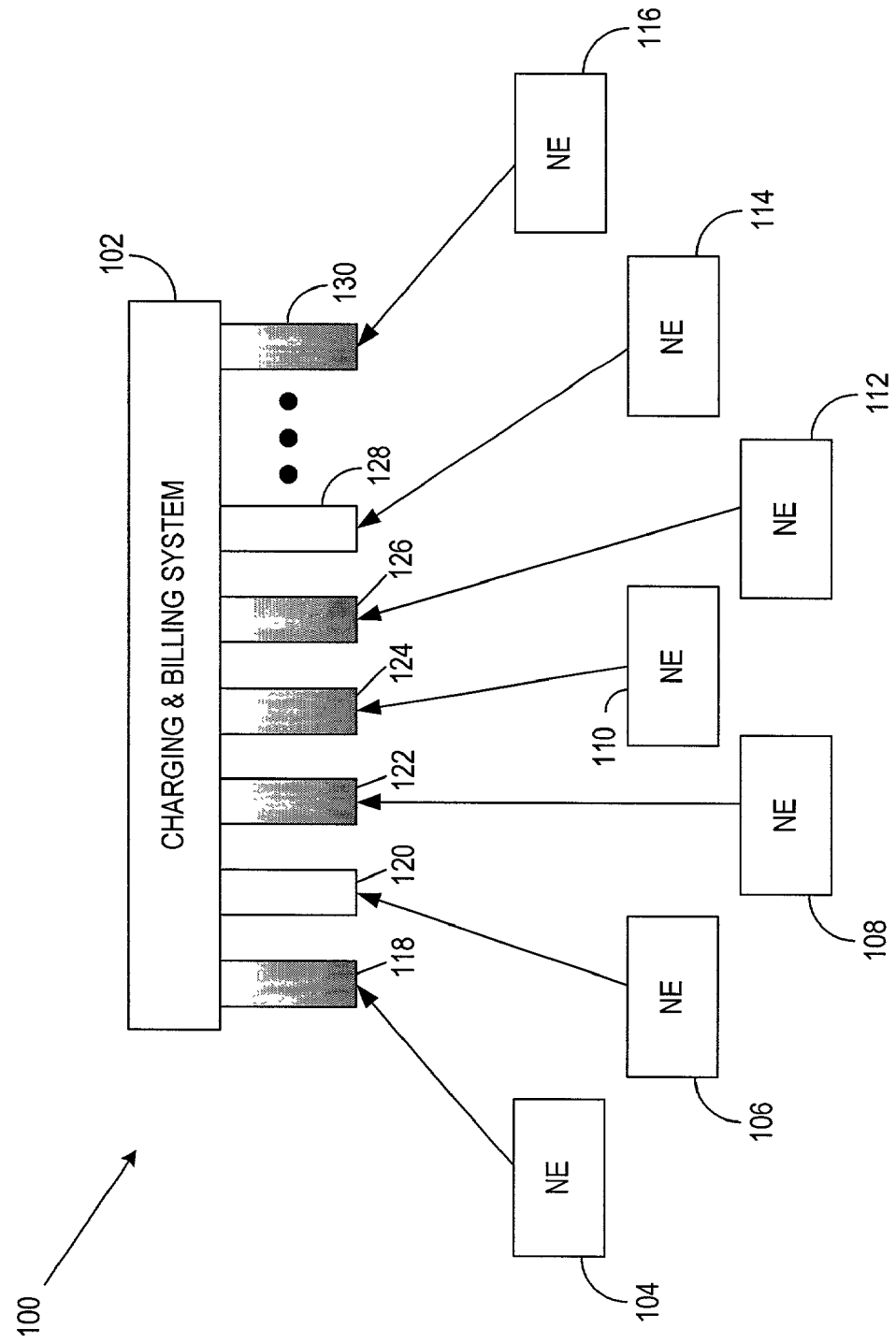
FIG. 1 is a block diagram of a prior art charging and billing architecture used to charge customers service use provided by various network elements.

FIG. 1 is a block diagram of a prior art charging and billing architecture 100 used to charge customers for use of services provided by various network elements. Network operators generally have some type of billing system, such as the charging and billing system 102. Generally, a billing system such as the charging and billing system 102 includes various independent applications. These independent applications, when operated together, are referred to as the billing system. The billing system 102 includes a number of major components. For example, a charging event record (hereinafter referred to as a charging event) is used to record the details of the call. In the postpaid context, a call-detail record (CDR) has traditionally been the name given to such a charging event. While "CDR" has generally been used to denote a charging event related to a postpaid paradigm, the term CDR may be used herein for convenience to denote a charging event associated with other charging paradigms, such as prepaid, real-time, etc. In any event, the call in which details are recorded traditionally include voice transmissions, but is also generally used to refer to transmissions of data, video, sound, and other transmittable content. The information in a charging event generally depends on the type of transmission, and the payment option selected. For example, in the context of postpaid services, usual information associated with a CDR may include start time of call, end time of call, duration of call, originating number, terminating number, number of bytes transferred, URL visited, etc. In the context of postpaid services, the CDR may be stored until time of billing.

Other billing system components include rating applications, and billing and invoicing components. Rating applications are systems and programs that apply the rate for the individual calls. Rating gives the call a value to be charged at the time of billing, taking into consideration promotions, discounts, etc. The billing system may be prepaid, real-time billing, postpaid, etc., and has the responsibility of collecting information from the rating system. Some billing systems account for promotions, discounts, and the like rather than having the rating system perform such a task. An invoicing system creates a file including the customer's information, and the corresponding billing information, so that invoices for the customer's usage may be created and dispatched.

In a conventional billing system, each of the various network elements (NE) 104, 106, 108, 110, 112, 114, 116 communicate charging/billing information to the charging and billing system 102. As networks continue to expand in the number and types of services available to users, more network elements 104-116 are implemented in the network. However, each of the various network elements 104-116 may collect and provide charging event information in different formats. The charging and billing, system 102 will need to know the format used by each particular network element in order to comprehend its content. For example, some network elements may provide such information in an ACSII (American Standard Code for Information Interchange) file, others in XML (eXtensible Markup Language) format, or other formats.

The charging and billing system 102 must therefore be able to comprehend each of the different formats for event records provided by the various network elements 104-116. This generally requires that an integration be performed for each network element. More particularly, the charging and billing system 102 must undergo an integration to allow it to understand and communicate with each of the network elements in which it is to collect and process billing information. Resulting integration modules 118, 120, 122, 124, 126, 128, 130 represent the specific conversion systems and applications required to convert the billing information in an incoming format to a format recognized by the charging and billing system 102. These conversions are represented by the format gradients at each of the integration modules 118-130. For example, the format of the transmitted billing information from network elements 106 and 114 are comprehensible by the charging and billing system 102, as represented by the uniform integration modules 120 and 128. Alternatively, the formats of the transmitted billing information from network elements 104, 108, 110, 112, and 116 are converted by the integration modules 118, 122, 124, 126, and 130 respectively. This conversion, and the need for specific integration of a new service to be operable with the existing charging and billing system 102, is an enormous task, requiring large amounts of time and money, and having a major adverse impact on getting a new service on the market fast.

This drawback of the prior art may be further illustrated through an example. Assume that the network element 104 is an MMSC (Multimedia Message Service Center) that produces charging events to, for example, transmit a digital image. The charging event may include information such as an IP address, the size of the image, etc. In the charging and billing system 102, the information required to perform rating, billing, and/or invoicing may be different from the information included in the charging event from the MMSC 104. For example, the charging and billing system 102 may include service logic to charge for services based on the resolution of the image transmitted, and the number of images transmitted. The service logic must therefore include integration or conversion logic to transform the information into something meaningful with respect to the service being purchased by the customer. Thus, if the information to be billed to the customer via the charging and billing system 102 is to be presented to the customer as a number of images and resolutions of each image, then the IP address, size of image, or other information provided by the MMSC 104 in the charging event must be converted by the service logic represented by the integration module 118. As described above, this results in expenditures of time and money to obtain the requisite integration from a company or other entity that provides such integration services, which adversely affects the time at which the MMSC 104 can be implemented in the network. The problem of requiring such integration is exacerbated as new services and network elements continue to be designed and deployed in the network. The present invention solves these problems.

Further, charging for network services can be based on postpaid, prepaid, direct pay, and other real-time or non-real-time payment methodologies. As new network systems are presented in the networks, these various payment approaches add significant complexities to existing charging and billing methodologies. For example, as more and more real-time interaction is required between networks and Operations Support Systems (OSS) systems, custom solutions must continually be derived. The present invention provides a solution to these problems, by expeditiously and effectively managing charging transactions from a variety of new services, regardless of the particular charging paradigm implemented by these new services.

Figure 2:
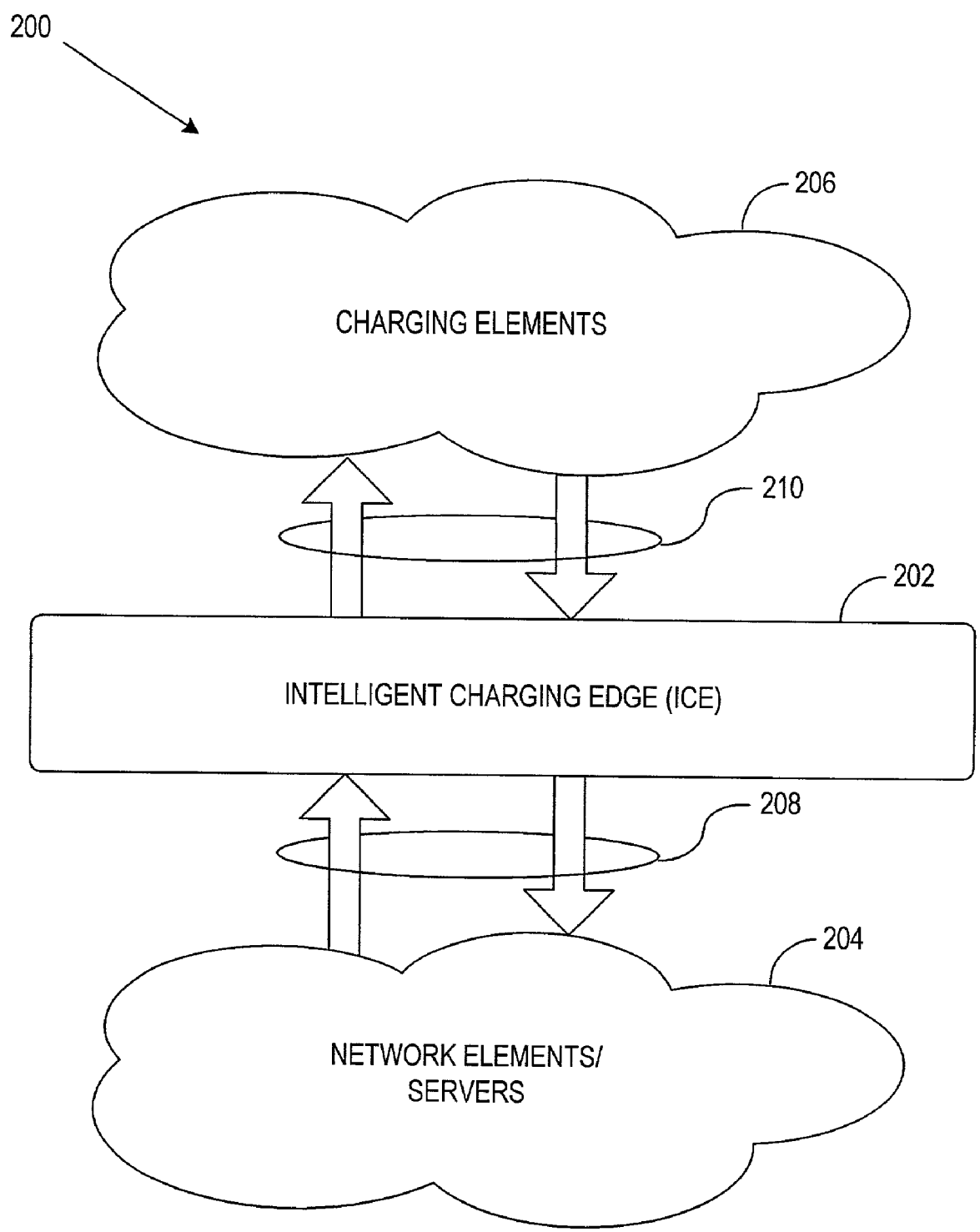
FIG. 2 is a block diagram of a network employing a charging edge in accordance with the principles of the present invention.

FIG. 2 is a block diagram of a network 200 employing a charging edge 202 in accordance with the principles of the present invention. In accordance with the invention, an Intelligent Charging Edge™ (ICE™) 202 is provided as a charging layer of the network 200. The ICE 202 provides an interface between the network elements and servers 204 and the billing and/or charging elements 206. The ICE 202 communicates with the network elements 204 as represented by links 208, and also communicates with the charging elements 206 as represented by links 210. The ICE 202 network layer essentially isolates the charging elements 206 from the network elements 204, thereby allowing data conversions and other processing to be performed while allowing both the network and charging elements to be otherwise unaware of each other. The ICE 202 removes the requirement that one or both of the network and charging elements be subject to integration, which further eliminates the need for integration service logic from residing in either the charging or network elements. This allows the charging elements 206 to do what they do best, which is charging and billing, while further allowing the network elements 204 to do what they do best, which is to provide the services in which they are designed. The interface between the two entities 204, 206 is thus extracted from these entities, and provided in a new network layer represented as the intelligent charging edge 202.

Figure 3:
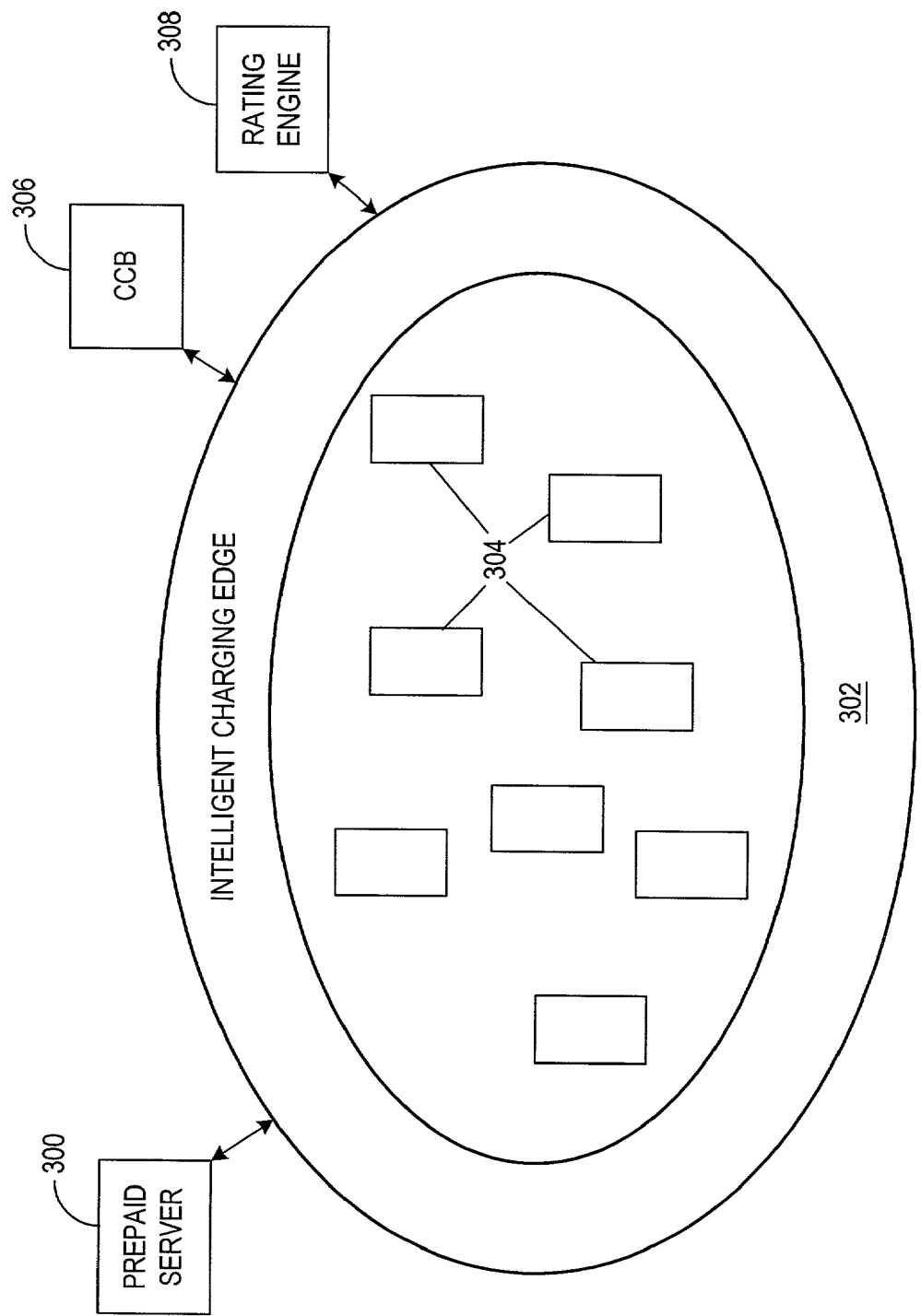
FIG. 3 is another representation of a network employing an intelligent charging edge in accordance with the invention.

FIG. 3 is another representation of a network 300 employing an intelligent charging edge 302 in accordance with the invention. This representation illustrates how the Intelligent Charging Edge (ICE) 302 isolates the network elements 304 from the charging and billing elements, such as the customer care and billing (CCB) system 306, the rating engine 308, and the prepaid server 310.

The network elements 304 represent any network element that may provide a service requiring rating, charging, billing, invoicing, or other general billing functionality. For example, the network elements 304 may include Serving GPRS Support Nodes (SGSN), Gateway GPRS Support Nodes (GGSN) which acts as a gateway between the GPRS network and a packet switched public data network, home location registers (HLR), WAP gateways, payment servers, Mobile Switching Centers (MSC), Unstructured Supplementary Service Data Centers (USSDC), Multimedia Message Service Centers (MMSC), or any other network element.

The charging elements on the other side of the ICE 302 include the CCB 306, the rating engine 308, and the prepaid server 310. The CCB 306 represents any type of charging and/or billing system. In one embodiment, the CCB 306 system offers a customer care and billing solution to meet the needs of ISPs and other companies offering Internet services. It may collect, store and administer customer information, and handle billing and payment requirements. The rating engine 308 gives service providers flexibility in pricing all service usage submitted by the data collection agents. A prepaid server 310 may be used for transactions involving prepaid customers. These charging elements are merely representative of various types of charging and billing systems, however the invention contemplates any type of charging and billing system that may be employed in the network.

The ICE 302, as described above, essentially isolates the network elements 304 from the various charging elements to the extent that neither the network elements nor the charging elements need to be fitted for direct communication of charging information therebetween. The ICE 302 hides the complexity of the network from the charging elements, and hides the complexity of the external charging systems from the network. In this manner, third party integration from network or backend OSS systems is enabled. Charging and related intelligence is left to the ICE 302, thereby allowing functionality with multi-vendor networks as well as multi-vendor Customer Relationship Management (CRM) and CCB systems.

Figure 4:
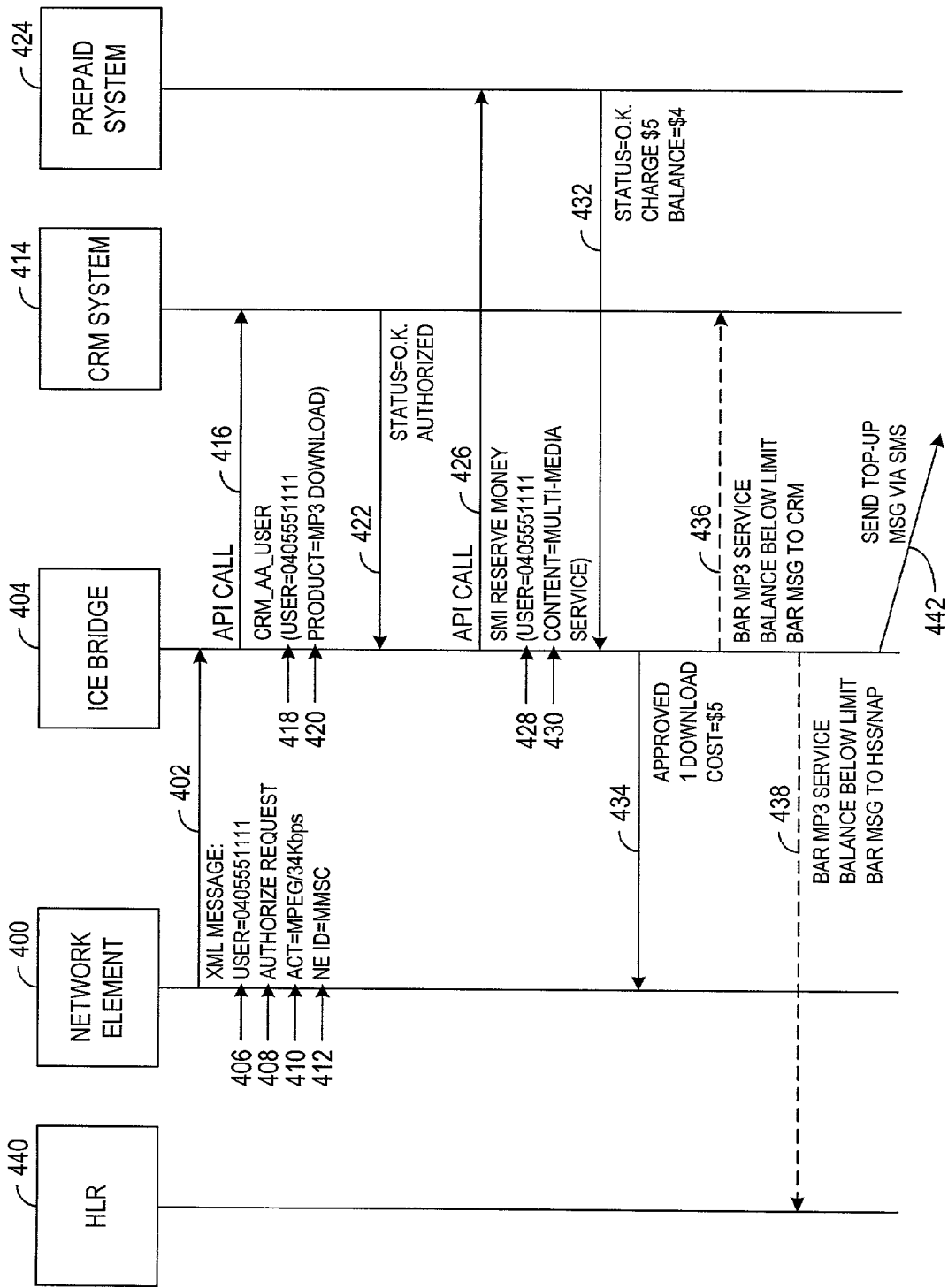
FIG. 4 is a block diagram illustrating a prepaid transaction initiated by a network element in a network implementing a charging bridge to form an intelligent charging edge in accordance with the principles of the present invention.
Figure 5:
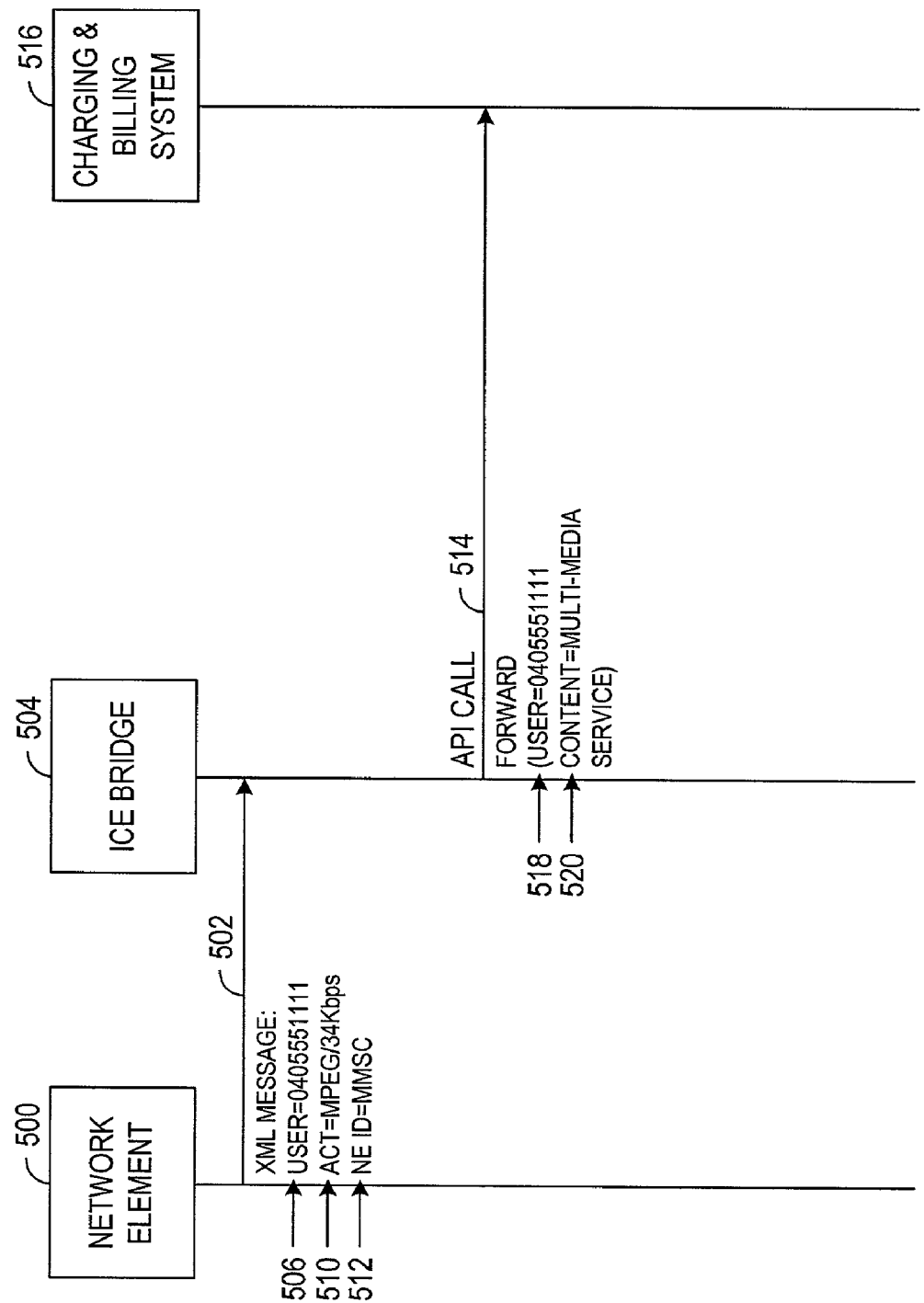
FIG. 5 is a block diagram illustrating a postpaid transaction initiated by a network element in a network implementing a charging bridge in accordance with the principles of the present invention.

The charging edge of the present invention therefore serves as a network layer, essentially buffering charging and billing elements from the various network elements that are, and will continue to be, availed to network service subscribers. The invention includes logically migrating network functionality that manages charging and billing operations away from the network elements and charging/billing elements, and into this new network layer. As will be described more fully below, this migration of charging and billing intelligence may also involve physically migrating charging and billing operations away from the network elements and charging/billing elements, but such physical separation is not necessary to implement the desired charging layer. This logical isolation allows the network elements to divorce themselves from the charging issue, and instead focus on the service that it provides. Analogously, the charging and billing elements need not be aware of the various types and quantities of network elements on the network, as the ICE layer manages the communication in a format required or preferred by the charging and billing systems. The intelligent charging edge provided by the invention includes systems that define boundaries of this charging edge, including an ICE "bridge" which serves to buffer the network elements and charging and billing elements in the desired manner. FIGS. 4 and 5 described below provide examples of how a bridging module in accordance with the present invention facilitates execution of various charging transactions.

FIG. 4 is a block diagram illustrating a prepaid transaction initiated by a network element in a network implementing a charging bridge to form an intelligent charging edge in accordance with the principles of the present invention. The network element 400 may represent any network system providing a service which is to be charged to the customer. Each network element in the network provides call detail information or other event records in some native format. For example, this information can be in ASCII format, XML, etc. Thus, while the example described in connection with FIG. 4 is described in terms of an XML message, it should be recognized that this is for illustrative purposes, and any other current or future type of data format for document exchange may alternatively be used. This include any current or future standard, or proprietary, data format. Further, the example associated with FIG. 4 identifies fields associated with an exemplary event record, however those skilled in the art will readily appreciate that any type of field may be associated with an event record, and those depicted in FIG. 4 are merely representative.

The network element 400 sends event record data via an XML message 402 to the charging edge bridge, referred to as the Intelligent Charging Edge (ICE) bridge 404. The ICE bridge 404 is an intelligent interface between the network and OSS domains, and performs a variety of functions including rule-based data transformations and interface management operations. For example, conversion rules may be applied such that when a network element generates a charging event, it is transformed by the bridge 404. Prior art network environments would require integration and translation at the charging center, as described in connection with FIG. 1. Therefore, if a network element provides information in the form of, for example, URLs (uniform resource locator), the number of bytes transferred, etc., the bridge 404 can translate that information into a format that is meaningful to the ultimate charging/billing destination.

The bridge 404 can also recalculate fields, to convert data to a particular format identifiable by the charging and billing system. For example, a piece of charging information identified at a network element may be identified in bytes, and the bridge 404 can convert this to kilobytes if that is the format desired by the charging destination. Another example is that the network element could assign numbers, symbols, or other non-descriptive identifiers to fields such as URL fields, such as assigning a value of "1" to a first URL associated with the service. The bridge 404 can convert that identifier to a textual, graphic, or other "descriptive" identifier more readily usable by the charging center and that properly identifies the particular service utilized by the customer. In other words, when billing, a meaningful service identifier should be provided to the customer so that the customer is aware of the particular service (e.g., URL) used. Fields may need to be combined, and mathematical calculations performed to provide the information in the appropriate format, which can be accomplished by the ICE bridge.

Other functions that can be carried out by the bridge 404 include filtering and routing functions. Conventionally, CDRs are all sent to the billing system, but if there is an error in a CDR it should not be charged for, and the charging center was traditionally responsible for dropping the CDR upon receipt and notification that the CDR was erroneous. The bridge can perform such filtering tasks at the network element, before the erroneous charging event is sent to the charging and billing system. Often charging events are sent to multiple destinations in addition to the charging and billing system, such as a data warehousing facility. Routing charging events can also be managed by the bridge 404, as well as other functions.

The bridge can also coordinate charging information generated by multiple network elements involved in a single session or call. In other words, a session or call may involve multiple network elements, each of which produces information that may be used to generate a charging event for that session. As dictated by the rules associated with the bridge 404, the bridge can collect and coordinate the charging information generated by the various network elements, and make rule-based decisions in response. For example, the bridge 404 can decide, based on the rules, to independently handle each of the charging information records from each of the network elements associated with the session. In this case, multiple charging events may result. Alternatively, the bridge 404 can determine that the rules are to be collectively considered, such that all or a portion of the collected charging information is used to create one or more charging events. The use of the bridge and the intelligent charging edge in connection with charging information generated by multiple network elements is described in greater detail in connection with FIG. 13.

The creation of the intelligent charging edge enables the network elements and charging/billing elements to essentially be unaware of each other. This arrangement allows a new service in a new network element to be quickly deployed, and allowing the bridge 404 to perform the interfacing functions. The information from each of the configured network elements can be collected via a single interface to the bridge 404, and the charging and billing system does not need to be cognizant of, nor integrated to work in connection with, any of the network elements.

In the illustrated example of FIG. 4, the message from the network element 400 to the ICE bridge 404 includes a user number 406, such as the user's phone number or other user identifier. An authorization request 408 is also part of the message 402, which is a request for authorization to use the requested service. The network element 400 also sends an accessed content type (ACT) 410, identifying the particular type of content that is requested and is to be charged. In this example, the ACT 410 identifies an MPEG (Moving Pictures Experts Group) file at a transfer rate of 34 Kbps. The message 402 also includes a network element identification (NE ID) 412, which in this example identifies the network element as an MMSC.

This event record may be unique to the particular network element 400, and is therefore provided in a format predefined by the network element 400. Conventionally, providing an event record in a unique format would require integration modules to be implemented at the charging and billing system. This would not be unusual that a network element does not provide event records in a format comprehensible by the destination charging/billing system, as network elements may assume a particular format for an end charging system which changes during the development of the network element.

The ICE bridge 404 solves this problem. The bridge 404 may be a distinct module (e.g., server) or may be integrated with another module, such as an all-IP charging gateway, a network element, or an OSS element. The bridge 404 intercepts the message 402 from the network element 400. Using Application Programming Interfaces (API), the network element 400 can provide the event record in a communicable format with the ICE bridge 404. Upon receipt, the bridge 404 uses predefined event management rules to analyze the network element identifier (NE ID), the authorization request, or other predetermined parameter to recognize that the request is for access to the CRM (Customer Relationship Management) system 414 or other CCB system. The bridge 404 determines the format required by the CRM system 414, extracts the appropriate information, and generates an API call 416 to the CRM 414 or other CCB system. Using predefined business rules, the ICE bridge 404 generates the API call 414 in a transformed format recognizable to the CRM system 414, such as the native format of the CRM 414.

In this example, the ICE bridge 404 determined that the CRM system 414 requires a user identifier 418, and a product identifier 420. The API call 416, named the CRM_AA_USER call in this example, provides the user and product identifiers 418, 420 as parameters of the API call 416. In this example, the user identifier 418 requires no transformation from the user identifier 406 generated by the network element 400, and it can be directly passed to the CRM system 414. This is determined by the bridge 404. However, the business rules associated with the bridge 404 determine that the CRM system 414 also requires a "product" identifier 420, which does not directly correspond to any of the parameters provided in the XML message 402. Therefore, the ICE bridge 404 transforms the relevant event record information in the XML message 402 to the requisite product identifier 420, which in this example is identified by "MP3 DOWNLOAD."

When the CRM system 414 receives the API call 416, it analyzes the received information in the format required by the CRM 414. The CRM 414 did not need to know anything about the network or network element 400 sending the request, and did not need to convert any information. Rather, the CRM 414 receives the information in a format recognizable by the CRM 414, processes the information, and returns a status message 422 indicative of whether the requested service is authorized. In this example, the returned status indicates that the requested service is authorized.

The status from the CRM 414 is returned to the ICE bridge 404. In this manner, the bridge 404 again bridges the CRM 414 and the prepaid system server 424. Using predefined rules, the ICE bridge 404 determines that the prepaid server 424 is now to be called. An API call 426, referred to as the SMI RESERVE MONEY call, includes parameters such as a user identifier 428, and a "content" identifier 430. In this example, the user identifier 428 requires no transformation from the user identifier 406 generated by the network element 400, and it can be directly passed to the prepaid system 424. Again, this determination is made by the bridge 404. However, the business rules associated with the bridge 404 determine that the prepaid system 424 also requires a "content" identifier 430, which does not directly correspond to any of the parameters provided in the XML message 402. Therefore, the ICE bridge 404 transforms the relevant event record information in the XML message 402 to the requisite content identifier 430, which in this example is identified by "MULTI-MEDIA SERVICE."

When the prepaid system 424 receives the API call 426, it analyzes the received information in the format required by the prepaid system 424. The prepaid system 424 did not need to know anything about the network or network element 400 sending the request, and did not need to convert any information. Rather, the prepaid system 424 receives the information in a format recognizable by the prepaid system 424, processes the information, and returns a status message 432 indicating whether the customer had the appropriate balance to carry out the requested transaction. In one embodiment, the returned message 432 may also identify the charge and balance amounts (e.g., $5 and $4 respectively). In this example, the returned status indicates that the requested service has been appropriately charged.

The ICE bridge 404 recognizes this message 432, and notifies the network element 400 via a message 434, thereby approving use of the service hosted by the network element 400. At this point, other functions may optionally be carried out. For example, a service bar/unbar function may be implemented, which enables or disables particular services for that user. FIG. 4 indicates that when the bridge 404 receives the message 432 from the prepaid system 424, it may optionally generate a barring message 436 to the CRM 414 for certain services having a cost greater than the current balance provided by the prepaid system 424 to the bridge 404 in the status message 432 (e.g., $4 balance). For example, if "products" identified via the product identifier 420 of "MP3 DOWNLOAD" cost a predetermined amount (e.g., $5) that is greater than the balance (e.g., $4) identified by the prepaid system 424, then further attempts to obtain "MP3 DOWNLOADS" or other services costing more than the predetermined amount must be barred. This barring message 436 is sent from the bridge 404 to the CRM 414 to notify the CRM 414 that the balance is below a predetermined limit. The CRM 414 can then provide the appropriate unauthorized status via status message 422 on subsequent attempts to access an MP3 DOWNLOAD (for example).

Similarly, a barring message may also be sent to other network elements in the network, such as depicted by the barring message 438 to the home location register (HLR) 440. The HLR 440 represents a network element that may contain the network level information, such as profile information or service records, for the requested service. Yet further messages may be initiated by the bridge 404, such as the "top-up" message 442. This message 442 may be directed to the user, such as via a Short Message Service (SMS) message, e-mail message, or other messaging mechanism known in the art. Such a message may be used to notify the user that the prepaid balance is below a certain threshold which will bar the user from accessing particular services, and thus serves as a reminder to the user to replenish the account.

FIG. 5 is a block diagram illustrating a postpaid transaction initiated by a network element in a network implementing a charging bridge in accordance with the principles of the present invention. The network element 500 may represent any network system providing a service which is to be charged to the customer. Each network element in the network provides call detail information or other event records in some native format. As was described in connection with FIG. 4, this information can be in ASCII format, XML, etc., and is described in terms of an XML message for purposes of illustration. Again, it should be recognized that the examples utilizing XML is for illustrative purposes, and any other current or future type of data format for document exchange may alternatively be used, including any current or future standard, or proprietary, data format. The network element 500 sends event record data via an XML message 502 to the charging edge bridge, referred to as the Intelligent Charging Edge (ICE) bridge 504. As in FIG. 4, this exemplary message includes a user number 506, an accessed content type (ACT) 510, and an network element identification (NE ID) 512, which in this example identifies the network element as an MMSC.

The bridge 504 ascertains from information contained in the XML message 502 whether this request is associated with a prepaid, postpaid, hot billing, or other charging paradigm. In this example, it is determined by the bridge 504 that the request is associated with a postpaid charging paradigm, and an API call 514 can be directly dispatched to the charging and billing system 516. However, before this API call 514 is sent, the ICE bridge 504 performs the necessary transformations of the XML message 502 content to place the information into a format recognizable by the charging and billing system 516. For example, the parameters 506, 510, 512 are received by the bridge 504, and transformed into an API call referred to as the FORWARD call having parameters such as a user identifier 518, and a "content" identifier 520. In this example, the user identifier 518 requires no transformation from the user identifier 506 generated by the network element 500, and it can be directly passed to the charging and billing system 516. This determination is made by the bridge 504. However, the business rules associated with the bridge 504 determine that the charging and billing system 516 also requires a "content" identifier 520, which does not directly correspond to any of the parameters provided in the XML message 502. Therefore, the ICE bridge 504 transforms the relevant event record information in the XML message 502 to the requisite content identifier 530, which in this example is identified by "MULTI-MEDIA SERVICE."

When the charging and billing system 516 receives the API call 514, it accepts the information, and adds the corresponding cost amount to an aggregated total for the user. The identifying information supplied such as the user identifier 518 and content identifier 520 can also be used by the billing system. The billing portion of the charging and billing system 516 can use this information to identify the transaction particulars and cost to the subscriber in a generated invoice.

The examples of FIGS. 4 and 5 are merely exemplary embodiments of the types of charging transactions that can be effectively managed by the ICE. The examples of FIGS. 4 and 5 are directed to prepaid and postpaid transactions respectively. However, the present invention is applicable to any type of charging paradigm, whether prepaid, postpaid, real-time, direct pay, etc. Further, the ICE is applicable to otherwise non-traditional charging categories that do not even fall into a currently known charging category.

As an example, a situation is described herein of a charging situation that would require an elaborate and complex solution in prior art charging systems, but is effectively managed by the principles of the present invention. This example does not necessarily fall into a currently known charging category such as prepaid, postpaid, etc. This example is provided to illustrate the ability of the ICE to be used as an intelligent buffer between the network and OSS systems, which circumvents the need for either the network or the targeted OSS system to be reconfigured to directly manage such a situation therebetween. Assume a wireless terminal user is browsing the network via a wireless terminal, such as a wireless telephone. The user comes across a web site hosted by a small, otherwise unknown bookstore, and desires to purchase a book. However, the user may not trust this unknown bookstore, and is hesitant to provide any personal or financial information in order to effect the purchase. In accordance with the invention, such a service provider can, for example, partner with known operators. This is beneficial to the service provider, as the small service provider does not need a separate charging and billing system, rating engine, etc. for the relatively small service provided, and in effect can use the operator's charging and billing systems. This is also beneficial to the user, as the user may be willing to provide the information to a known, partnering operator. For example, the operator could be the company that the user uses for telephone service, wireless service, Internet service, or some other company that the user is familiar with or otherwise conducting business with. The small service provider can provide an indication or link on the web site that he/she is a value-added reseller for this associated operator. The user can then just identify the book desired, and upon ordering, a message is sent to the Intelligent Charging Edge, which determines that the service provider exists and is authenticated. The user's information can already be stored by the operator, and when the user orders the book, the service provider charges the operator, and the operator puts the charge on the user's bill (or adjusts a prepaid account, etc.). This type of transaction, while not falling into a specific postpaid, prepaid, etc. category, can be effectively managed by the ICE in accordance with the present invention. This is just one example of how the ICE can be used to carry out otherwise complex and non-traditional charging transactions and payment methods that would require custom solutions in prior art systems.

Figure 6:
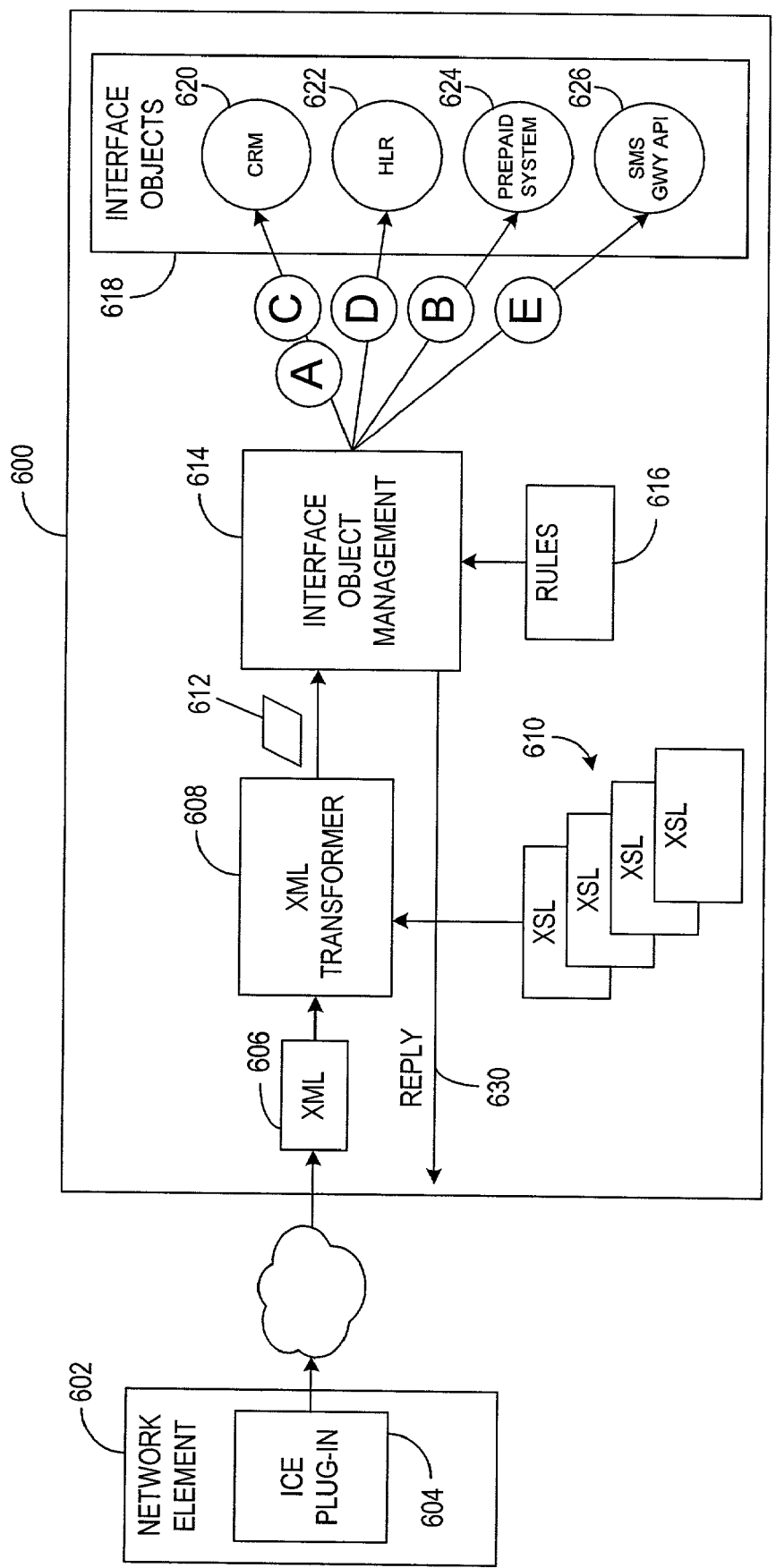
FIG. 6 is a block diagram of an exemplary embodiment of a charging edge bridge in accordance with the principles of the present invention.

Referring now to FIG. 6, an exemplary embodiment of a charging edge bridge 600 is provided in accordance with the principles of the present invention. In accordance with one embodiment of the invention, the charging edge bridge 600 is attached to the core network, but can alternatively be attached near the core network. A network element 602 requiring communication with one or more charging/billing components is equipped with a software plug-in module 604. As is known in the art, Java™ is a general-purpose, object-oriented language, and is a "write once, run anywhere" programming language. Because Java is used extensively by object-oriented developers, the present example assumes a java-based implementation at the network element. However, it should be recognized that the invention is equally applicable to any data format or programming language used at the network element, such as CORBA, C++, SQL, COM, and other languages or specifications. XML is a text-based markup language that is currently used extensively for data interchange on the Web. As with HTML, data is identified using tags, which are collectively known as "markup". XML tags identify the data, and act as a field name in the program. As is known in the art, an Application Program Interface (API) is an interface that enables programs to communicate with each other. The present examples assumes a Java-XML API for purposes of illustration. However, it should be recognized that other APIs may alternatively be implemented, depending on the interface utilized. Thus, in one embodiment, this plug-in module 604 is a JavaXML API serving as a communication interface to communicate XML messages, in this example, with the bridge 600.

The XML message 606 is received at the bridge 600, and provided to a transformer module 608. Because this particular example involves an XML message 606, the transformer module 608 is an XML transformer. The transformer 608 performs translations of the event record(s) contained in the XML message 606 by applying predefined business rules 610. In this particular example, the business rules are described in XSL (eXtensible Stylesheet Language), although XSL is just one of many ways in which such rules may be described in accordance with the invention. Generally, XSL can be used to convert XML documents into other formats. The XML transformer 608 applies a particular one or more sets of the rules 610 to the XML file 606 to create a new document, file, data stream, etc. (hereinafter referred to as a file) in another format. Again, it should be recognized that the specific use of XML and XSL in this example is for purposes of illustration; however the invention is applicable to any input message format and any predefined rules to generate a transformed file at the output of the transformer 608.

Using the rules 610, the transformer 608 determines what should be done with the XML message 606. In one embodiment, the rules 610 direct the transformer 608 to convert certain parameters from the XML message 606 into a format that can be recognized by the targeted charging/billing element. When applied to the XML message 606, the rules 610 also determine which of the charging/billing elements is to be called. For example, the rules may indicate that the destination device is dependent on the network identifier (NE ID) and/or an authorization request. More particularly, the rules may indicate that if the NE ID is, for example, an MMSC, then the charging/billing device to be called is a CRM.

Thus, the resulting file 612 from the XML transformer 608 includes a transformed version of the XML message 606 provided by the network element 602, along with instruction information identifying what should be done with this request. Based on this file 612, a particular destination interface may be called. This is accomplished by providing the file 612 to the interface object management module 614. Additional object configuration rules 616 are applied to the file 612 at the interface object management module 614, to direct the information to the appropriate interface object associated with the interface object module 618. It should be noted that although the interface objects module 618 is depicted as integral to the ICE bridge 600, this module may be separate from the bridge 600, such as in a separate server. A variety of interface objects may be provided, so that when a new charging/billing system is deployed in the network, a corresponding interface object can be provided. For example, if a new CRM is included in the network, the bridge 600 can be equipped with a CRM interface object 620 so that the new CRM can be called. Other examples of interface objects are also shown, such as the HLR 622, prepaid system 624, and SMS Gateway API 626 interface objects. Any number of interface objects can be provided, at least one for each charging/billing systems to be used in the network.

The object configuration rules 616 facilitate selection of the appropriate one of the interface objects. In other words, the rules 616, in connection with the information file 612, allow the interface object management module 614 to find the appropriate interface object. For example, the rules 616 applied to the file 612 at the interface object management module 614 may generate an address to the appropriate interface object, whether that interface object is located in the bridge, or in a separate system remote from the bridge 600.

As an example, the transformer 608 transforms the information from the XML message 606 to a different format, such as a format containing actual object names, method names and attributes, etc. This transformation is facilitated by the business rules 610. The interface object management module 614 will call each object in this resulting information file 612, based on the rules 616.

Figure 7:
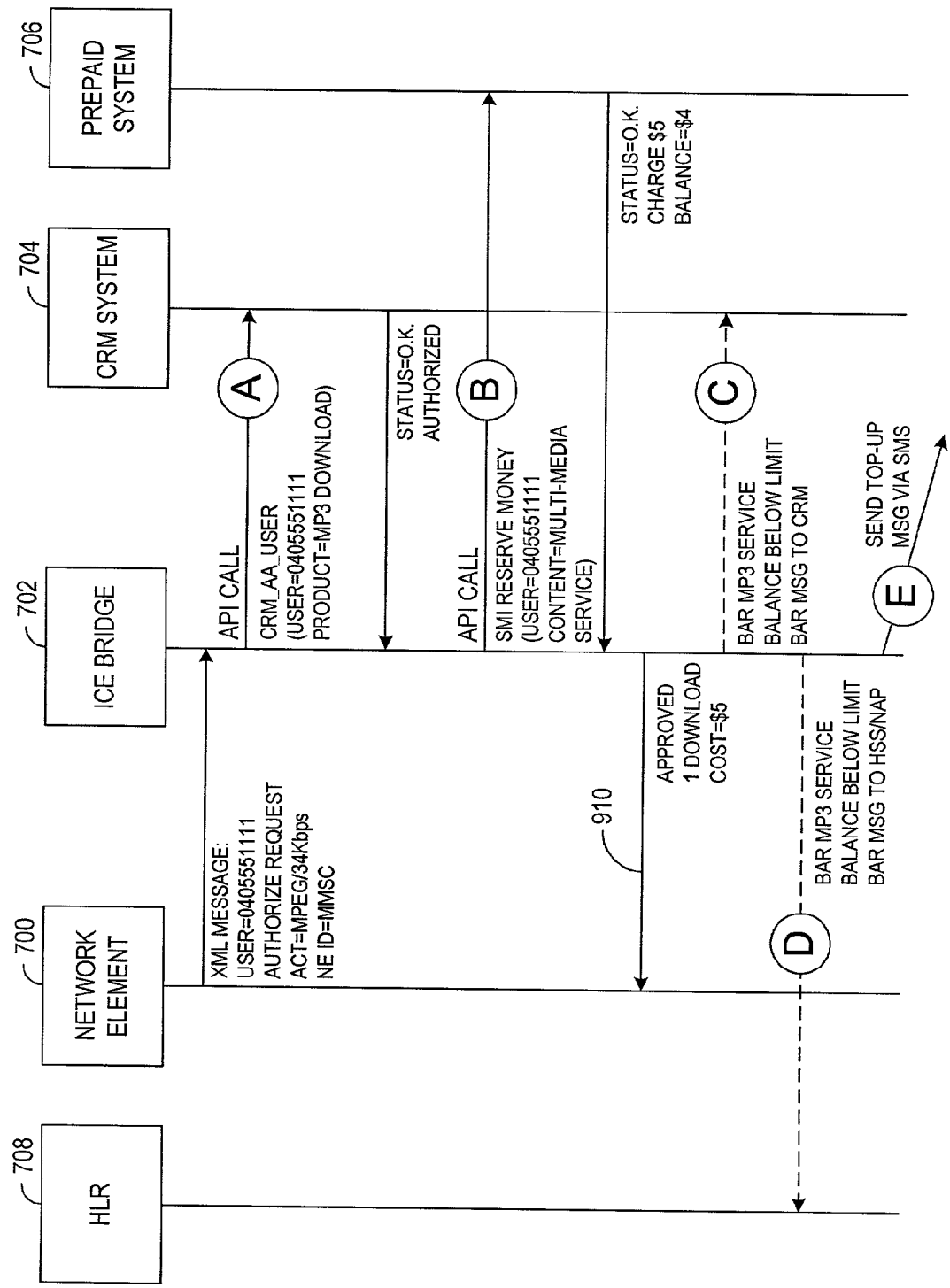
FIG. 7 is a diagram illustrating an exemplary manner in which a charging bridge according to the invention carries out a plurality of calls in connection with a charging transaction.

Referring briefly to FIG. 7, which corresponds to the prepaid charging transaction described in connection with FIG. 4, each of five calls that are made to interface objects in the charging transaction are identified by the letters A, B, C, D, and E. After the network element 700 sends a message to the ICE bridge 702, the bridge 702 sends an API call, designated by the letter A, to the CRM system 704. When the bridge 702 receives an authorized status, it sends an API call B to the prepaid system 706. Barring calls may be made to the CRM 704 and HLR 708 as shown by designations C and D respectively. Finally, a top-up call E may be made to notify the user to replenish the account.

These calls are also shown in FIG. 6 as corresponding calls A, B, C, D, and E. Call A is made to the CRM, which occurs via the CRM interface module 620. Call B is made to the prepaid system via the prepaid system object interface 624, as shown by call B. Barring calls are made to the CRM and HLR via CRM interface object 620 and HLR interface object D respectively. Finally, the top-up call E is made to an SMSC via the SMS gateway API object interface 626. A reply message 630 to the network element 602 may also be made to notify the network element 602 of information such as the approval of the requested service. This is also shown in FIG. 7 by the reply message 710, which further corresponds to reply message 434 in FIG. 4.

Figure 8:
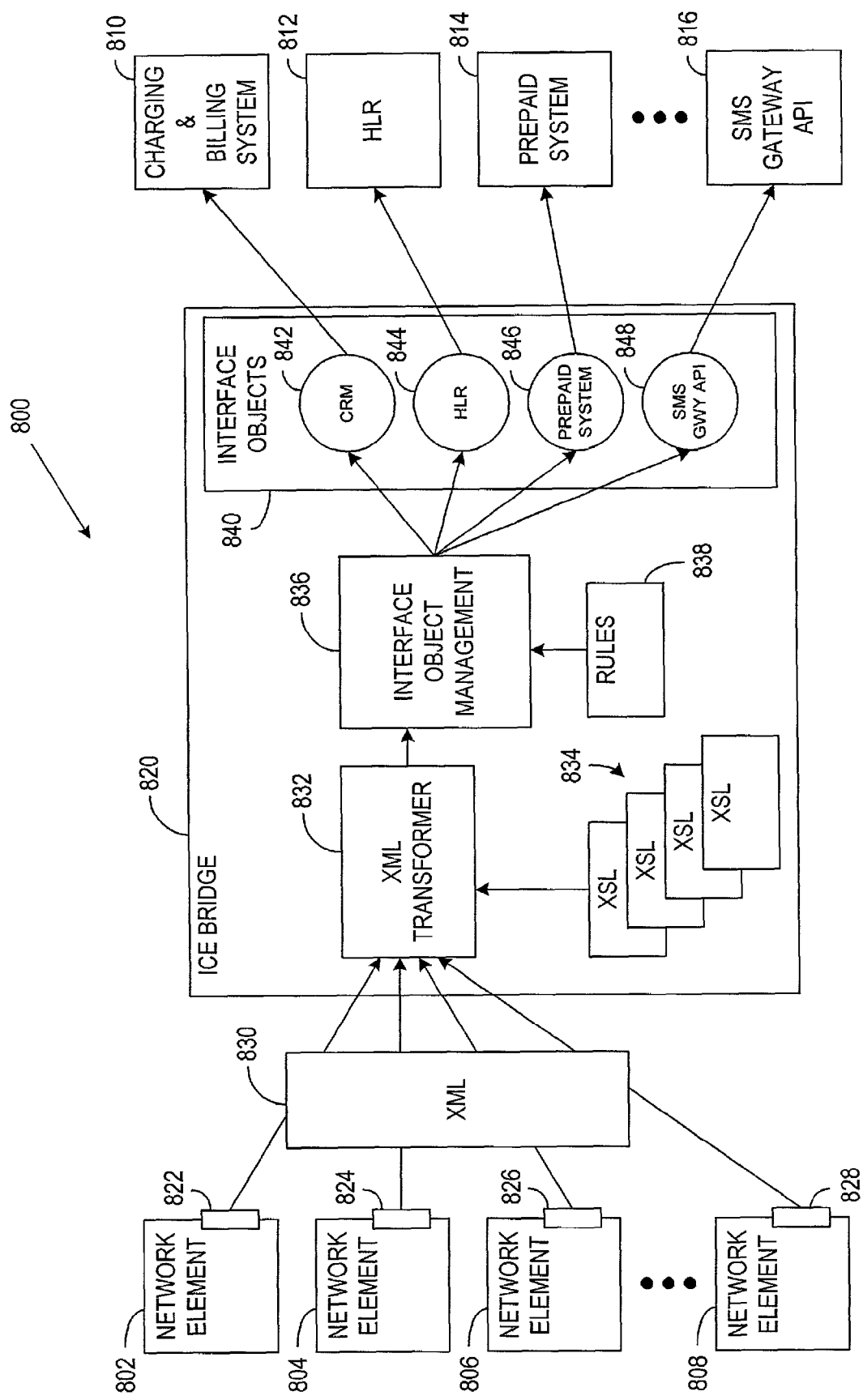
FIG. 8 is an exemplary embodiment of a network employing an intelligent charging edge (ICE) layer in accordance with the principles of the present invention.

FIG. 8 is an exemplary embodiment of a network 800 employing an intelligent charging edge (ICE) layer in accordance with the principles of the present invention. In this embodiment, multiple network elements 802, 804, 806, 808 are coupled to the network. Various charging and billing elements 810, 812, 814, 816 are also coupled to the network, to carry out the various billing functions required by the network elements 802-808. The network elements 802-808 are essentially part of the traditional network portion of the network, while the charging elements 810-816 are part of the OSS side of the network. The ICE bridge 820 represents the network-to-OSS interface for this larger network 800.

Each of the network elements includes an API, which may be a plug-in module. For example, the network element 802, which is a WAP gateway in this example, is equipped with an API plug-in 822. Similarly, network elements 804, 806, through 808 are equipped with, plug-in modules 824, 826, through 828 respectively. As described above, these plug-ins 822-828 include an API, such as a Java-XML API known in the art. The network elements call their respective API when a charging event is available, and the API carries out the necessary steps to efficiently pass the charging event over the network using an appropriate protocol to the bridge 820.

The API modules 822-828 are, in the illustrated embodiment, designed to be used with charging events in Extensible Mark-up Language (XML) 830. XML is a computer language that is used to format data into a text file in an organized manner, which can be easily generated and read by a computer. It uses tags of the form <word> to delimit pieces of data and attributes for putting values to tags. However, it will be readily apparent to those skilled in the art from a reading of the description provided herein that other suitable languages and/or mark-up languages could be used.

Analogously to that described in connection with FIG. 6, the XML 830 message is received at the bridge 820, and provided to the XML transformer module 832 which performs translations of the event records (e.g., CDRs) contained in the XML message by applying predefined business rules 834. Using the rules 834, the transformer 832 determines what should be done with the XML message, and in one embodiment the rules 834 direct the transformer 832 to convert certain parameters from the XML message into a format that can be recognized by the targeted charging/billing element 810-816. The rules 834 also determine which of the charging/billing elements is to be called.

Based on the information provided by the XML transformer 832, a particular destination interface may be called by providing the information to the interface object management module 836. Additional object configuration rules 838 are applied to the information received at the interface object management module 836, to direct the information to the appropriate interface object associated with the interface object module 840. The interface objects module 840 may be integral or external to the ICE bridge 820. A variety of interface objects may be provided, so that when a new charging/billing system is deployed in the network, a corresponding interface object can be provided. The bridge 820 can be equipped with multiple interface objects, such as the CRM interface object 842, HLR interface object 844, prepaid system 846, SMS gateway API 846, or others. The object configuration rules 838 facilitate selection of the appropriate one of the interface objects. These interface objects facilitate the interface with the corresponding one of the OSS systems. For example, the charging event in its transformed form is provided to the charging and billing system (i.e., CRM) 810 via the CRM interface object 842.

An intelligent charging edge in accordance with the present invention may implement one or more ICE bridges. The bridge(s) may be implemented in a separate network server device, or alternatively may be physically located at any point between the network elements and the OSS elements. While the physical location of the bridging elements may vary, the implementation of these bridges provides a logical network layer that effectively buffers the network domain from the OSS (e.g., charging/billing) domain.

Figure 9:
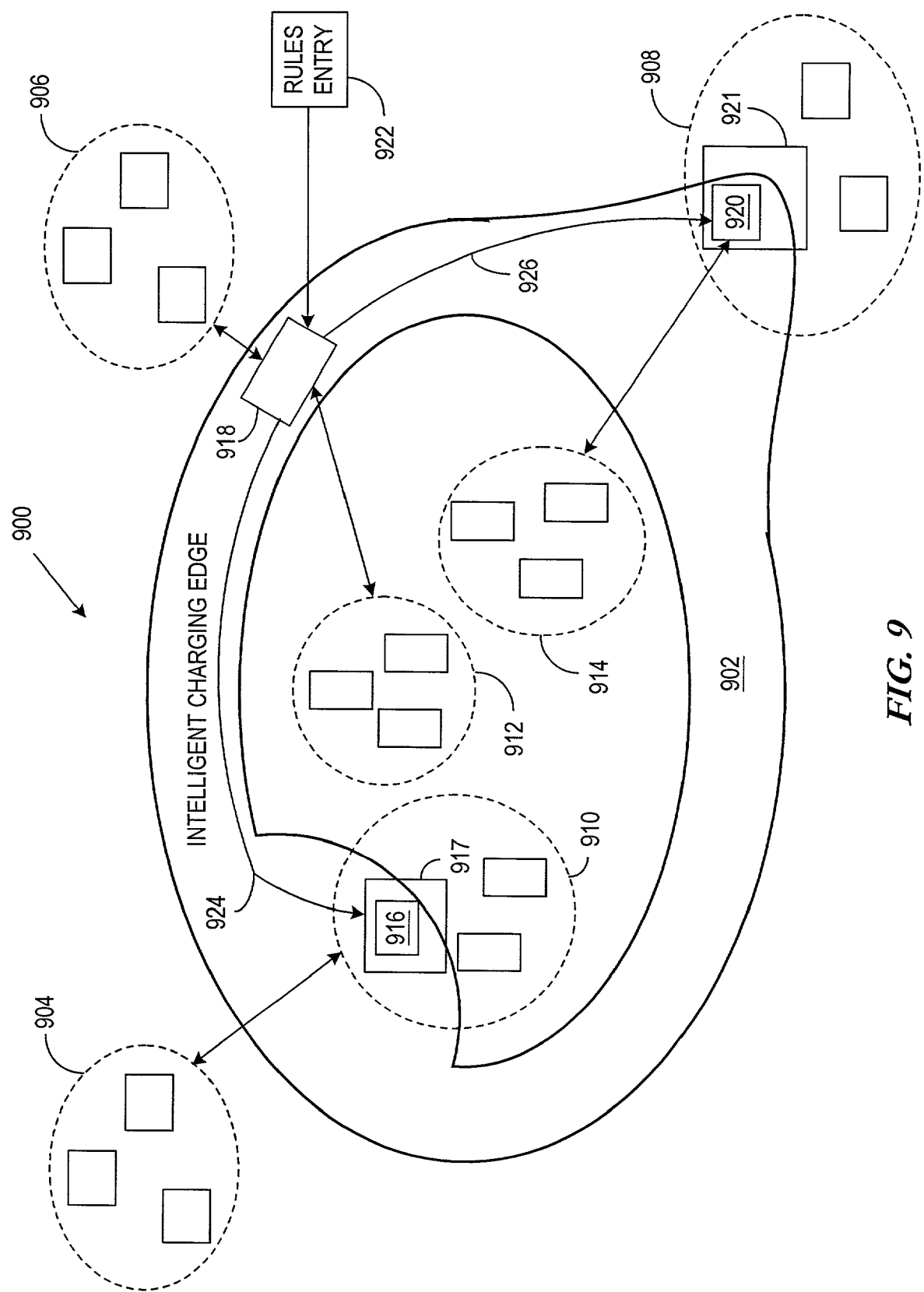
FIG. 9 illustrates an embodiment of one manner of employing a plurality of charging edge bridges in a network system.

FIG. 9 illustrates an embodiment of one manner of employing a plurality of charging edge bridges in a network system 900. The "charging edge" 902 essentially isolates the network elements and the OSS elements. In the illustrated example, various groups of OSS elements 904, 906, 908 each include charging, billing, rating, invoicing, and/or other charging-related devices. As part of the network, various network element groups 910, 912, 914 include network elements such as those previously described. Each group of network elements communicates with one or more OSS elements via at least one charging edge bridge which forms part of the intelligent charging edge 902. For example, bridge 918 bridges the network elements 912 and the OSS elements 906. As can be seen, any number of bridges can be used in creating the intelligent charging edge.

The bridging modules may be physically located at any point between the network and OSS elements. In one exemplary embodiment, the ICE bridge is a separate server, such as ICE bridge 918. In such an embodiment, the bridge 918 is physically distinct from either the network elements or OSS elements in which it interfaces. In another embodiment, a bridge 916 is located proximate or integral to a particular network element 917. The intelligent charging edge 902 is extended into the network domain 910 in this case to logically include the bridge 916, thereby illustrating that the physical location does not impact the logical charging edge.

Similarly, another embodiment illustrates that a bridge 920 may be physically located proximate or integral to a particular charging/billing system 921. For example, the charging/billing system 921 may be an extensive billing system capable of performing billing services for a substantial number of network elements, thereby warranting physical implementation of a bridge 920 proximate to that charging/billing system 921. Again, the ICE 902 is extended into the OSS domain 908 in this case to logically include the bridge 920.

An additional issue arising when implementing the ICE bridges 916, 918, 920, etc. is the manner in which these bridges are configured. As previously described, each bridge includes various types of rules that are applied which gives the ICE bridge the intelligence needed to essentially eliminate such responsibility from either the network or OSS devices. In a preferred embodiment of the invention, a person/entity such as a service designer who enters the rules does not need to be aware of the number of bridging devices or other devices associated with the ICE layer. Rather, rules are entered in a general fashion, and the systems of the intelligent charging edge route the rules to the appropriate bridging devices. One manner of achieving this is to populate the ICE bridges 916, 918, 920 by having rules entered at a particular, centralized ICE bridge. For example, through a rule input console 922, all rules are entered into the primary bridge 918. Primary bridge 918 then appropriately distributes the rules to other bridges 916, 920 that have responsibility for only a certain set of services, as depicted by rule distribution paths 924, 926 respectively.

A more particular example assumes a number of services, such as five services A, B, C, D, E. Services A and B may be handled by bridge 918, and the remaining services C, D, E may be handled by bridge 916. Bridge 918 is made the primary bridge. When rules are entered at the rule input console 922, these rules will be directed to the primary bridge 918. In one embodiment, this holds true regardless of the number and locations of various rule input consoles 922, such that initial entry of rules from any input location will be directed to the primary bridge. The collective rules entered at the various rule input consoles represent the rules intended for the services A, B, C, D, E. These rules are targeted to a particular service, however, and the primary bridge 918 routes rules intended for particular services to the bridges that serve those particular services. For example, the primary bridge 918 maintains possession of the rules that it will use to bridge the network element group 912 and the OSS elements 906, and will pass on rules to bridges 916 and 920 for interfacing network element groups 910 and 914 with OSS elements 904 and 908 respectively. In this manner, the bridges that are not designated as the primary bridge (e.g., bridges 916, 920) will receive their respective rules from the primary bridge 918, and will not know, or need to know, about services unrelated to its specific duties.

With respect to the rule input system 922, this can be any computing device or terminal capable of receiving such rules. For example, a graphical user interface (GUI) may be provided for a user to create and enter rules in a user-friendly environment, essentially identifying what actions should be taken for particular services provided by the network elements. The back end of that GUI then maps these rules from the GUI to different ICE bridges, which is first directed to the bridge designated as the primary, centralized bridge. Thus, the primary bridge pushes rules towards the network to various other bridges, while the collective bridging and other elements maintain these rules at the intelligent charging edge. The primary bridge maintains information as to which ICE bridge will be managing which services. This can be accomplished, for example, by having each ICE bridge notify the primary bridge as to which services/network elements it will be serving. The primary bridge can be loaded with this mapping information through other means as well.

Figure 10:
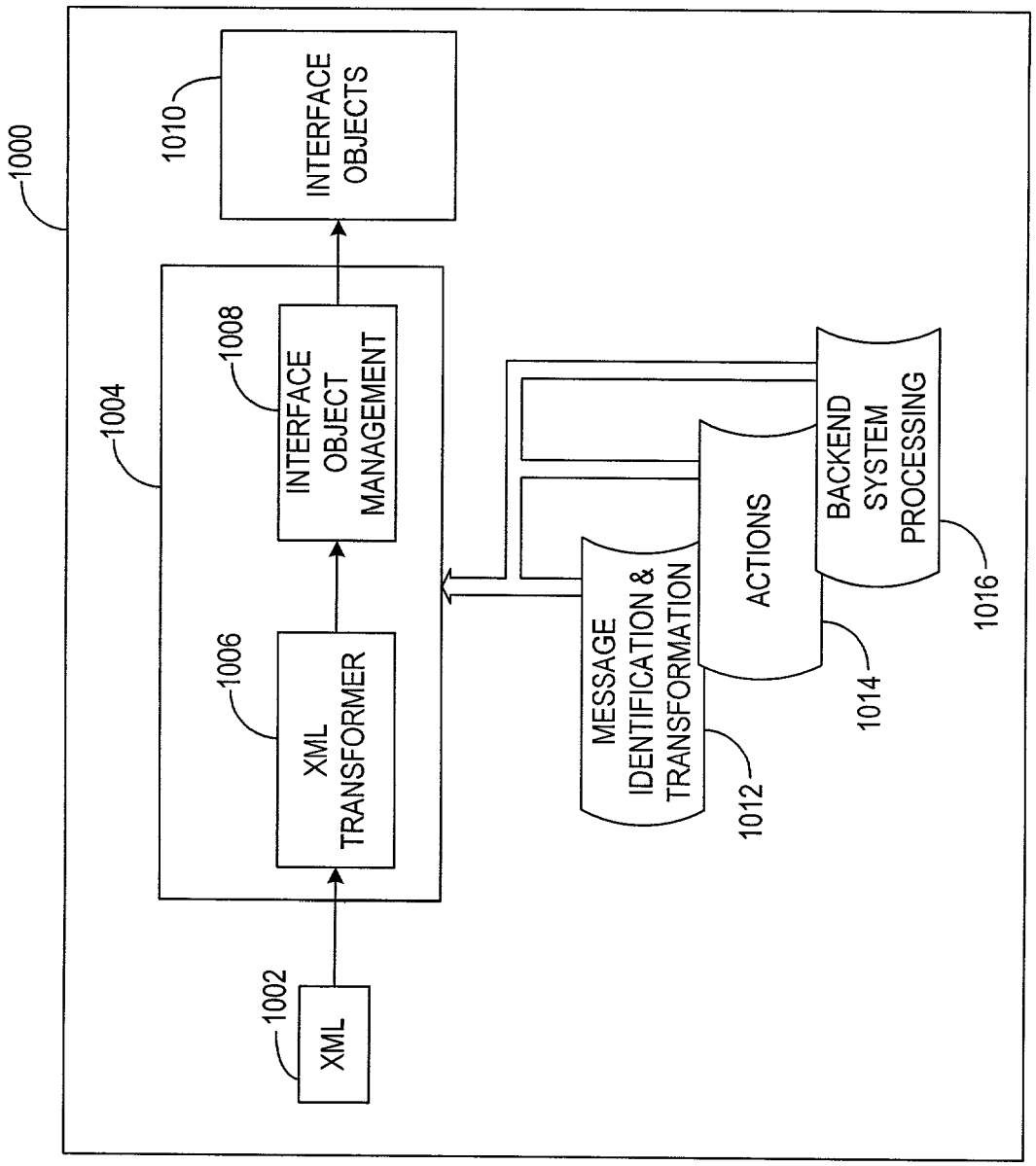
FIG. 10 illustrates representative types of business rules utilized in a charging bridge in accordance with the invention.

Application of these rules was discussed in connection with FIG. 6. Any number of rules may be applied, depending on the service and the desired actions. FIG. 10 illustrates some exemplary types of business rules utilized in a bridge 1000. Bridge 1000 is analogous to the bridge 600 described in connection with FIG. 6, and includes XML message 1002, a rules processing module 1004 including transformer module 1006 and interface object management module 1008, and interface object module 1010. In this embodiment, three types of rules are illustrated, including message identification rules 1012, actions rules 1014, and backend system processing rules 1016. The message identification rules 1012 include information as to how to identify messages via values, value ranges, properties, attributes, etc. in the incoming message. An initial transformation of the message includes utilizing the rules to specify what actions are to be taken when a message matches these predefined filtering rules. The conversion, field recalculation, filtering, and routing functions described in connection with FIG. 4 are examples of the message identification and transformation rules.

The actions rules 1014 are those rules that specify what actions are to be taken for a given request that has been filtered. Examples of these actions are authentication, credit checks, determining whether a transaction is prepaid, postpaid, etc. Examples of these actions include the API calls 416, 426, 514 shown and described in connection with FIG. 4 and 5.

Another tier of rules is the backend system processing rules 1016. These rules interpret the responses returning from backend systems, and take the appropriate action. Examples of such actions include bar/unbar actions such as the barring messages 436, 438 shown and described in connection with FIG. 4. Another example is the top-up message 442 shown in FIG. 4. In other words, these rules 1016 define actions to be taken in response to parameters recognized or received from the systems to which the bridge 1000 is interfacing with.

These rules govern the functions performed at the bridge 1000. Given the general exemplary rules 1012, 1014, 1016 shown in FIG. 1000, a number of bridge functions can be performed. Incoming messages may be transformed to a required internal format as well as transformed to multiple formats required by backend servers in the OSS domain. The bridge 1000 also locates the appropriate business rules for a given message and executes the relevant business objects. Functions may be invoked in the backend servers (i.e., charging/billing/rating elements in OSS domain) to execute necessary authentication/authorization functions based on service type such as WAP, e-mail, GPRS, etc. Similarly, functions may be invoked in the backend servers to execute necessary authentication/authorization functions based on payment type such as prepaid, postpaid, direct pay, etc. Credit checks can be invoked in the backend servers through application of the appropriate rules, when credit checks are necessary. Advice of Charge, which allows customers to query the approximate charge for a call or service, may also be configured into business rules and managed by the bridge 1000. In cases such as prepaid services where an account balance is maintained by a backend system, messages such as top-up messages and bar/unbar messages may be invoked in the backend systems via application of rules in the bridge 1000. User status, balance, etc. can be synchronized with OSS systems and external prepaid servers, and real-time service-related changes to subscriber service settings or attributes may be performed by invoking functions in backend servers. Further, the bridge 1000 can make decisions as to how to route incoming charging-related messages based on the rules preprogrammed to the bridge 1000. For example, as was described in FIG. 6, object configuration rules may be applied at an interface object management module to direct the information to the appropriate interface object. The bridge 1000, in connection with the rules, can thus handle all transactions related to a single message in a transaction-safe manner. The aforementioned represent examples of the types of functions that can be performed by the ICE bridge in accordance with the present invention. However, as will be readily apparent from those skilled in the art from a reading of the description provided herein, other rules and corresponding bridge functions may also be implemented without departing from the scope of the invention.

Figure 11:
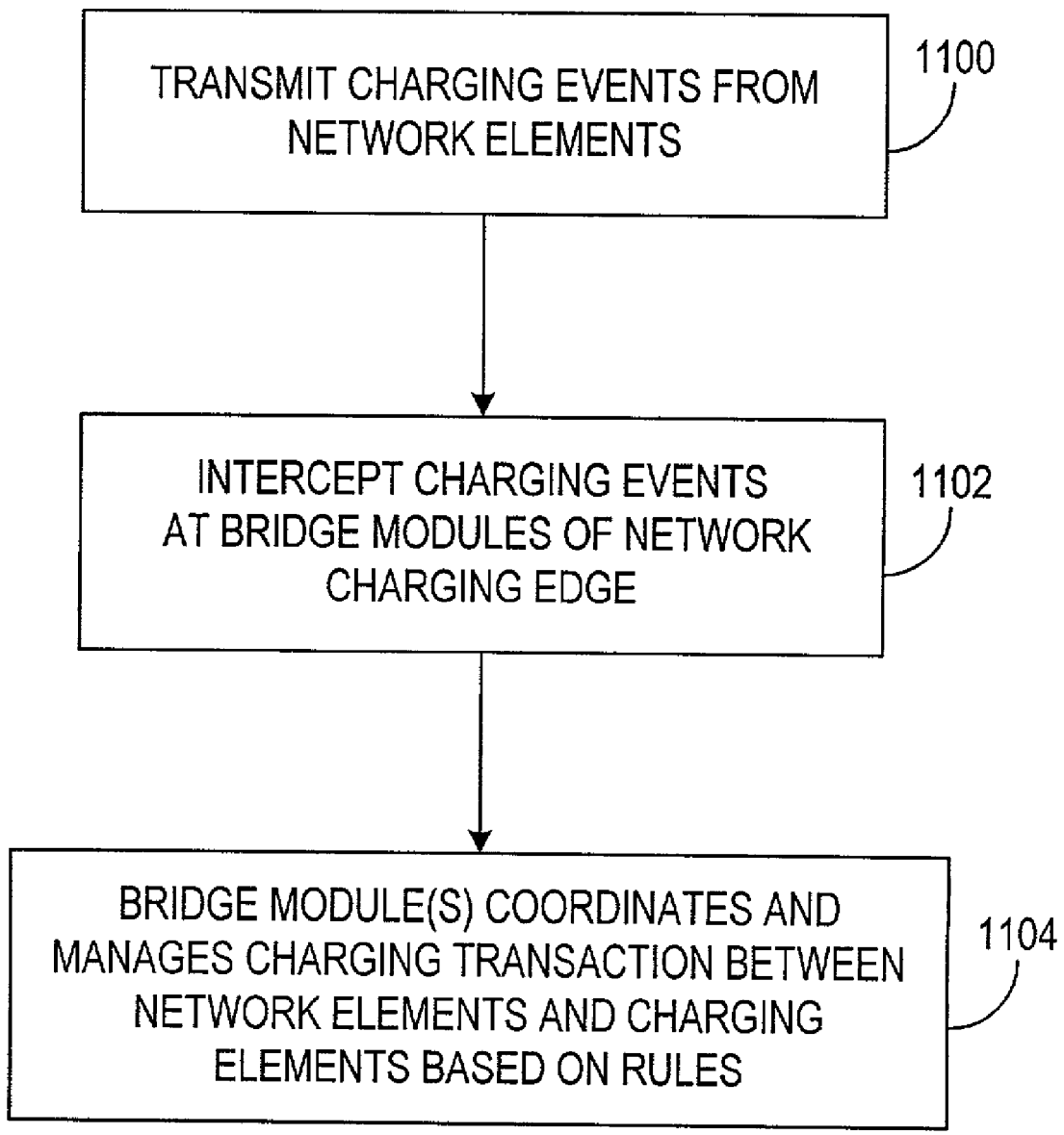
FIG. 11 is a flow diagram of an exemplary manner of implementing an intelligent charging edge in accordance with the principles of the present invention.

Referring now to FIG. 11, a flow diagram is provided of a manner of implementing an intelligent charging edge in accordance with the principles of the present invention. One or more network elements hosting billable services may each transmit 1100 charging events. These charging events are intercepted at the bridge modules of the intelligent charging edge as shown at block 1102. One or more bridge modules forming part of the ICE coordinate and manage charging transactions between the network elements and the charging elements in accordance with rules resident in the bridge modules, as shown at block 1104.

Figure 12:
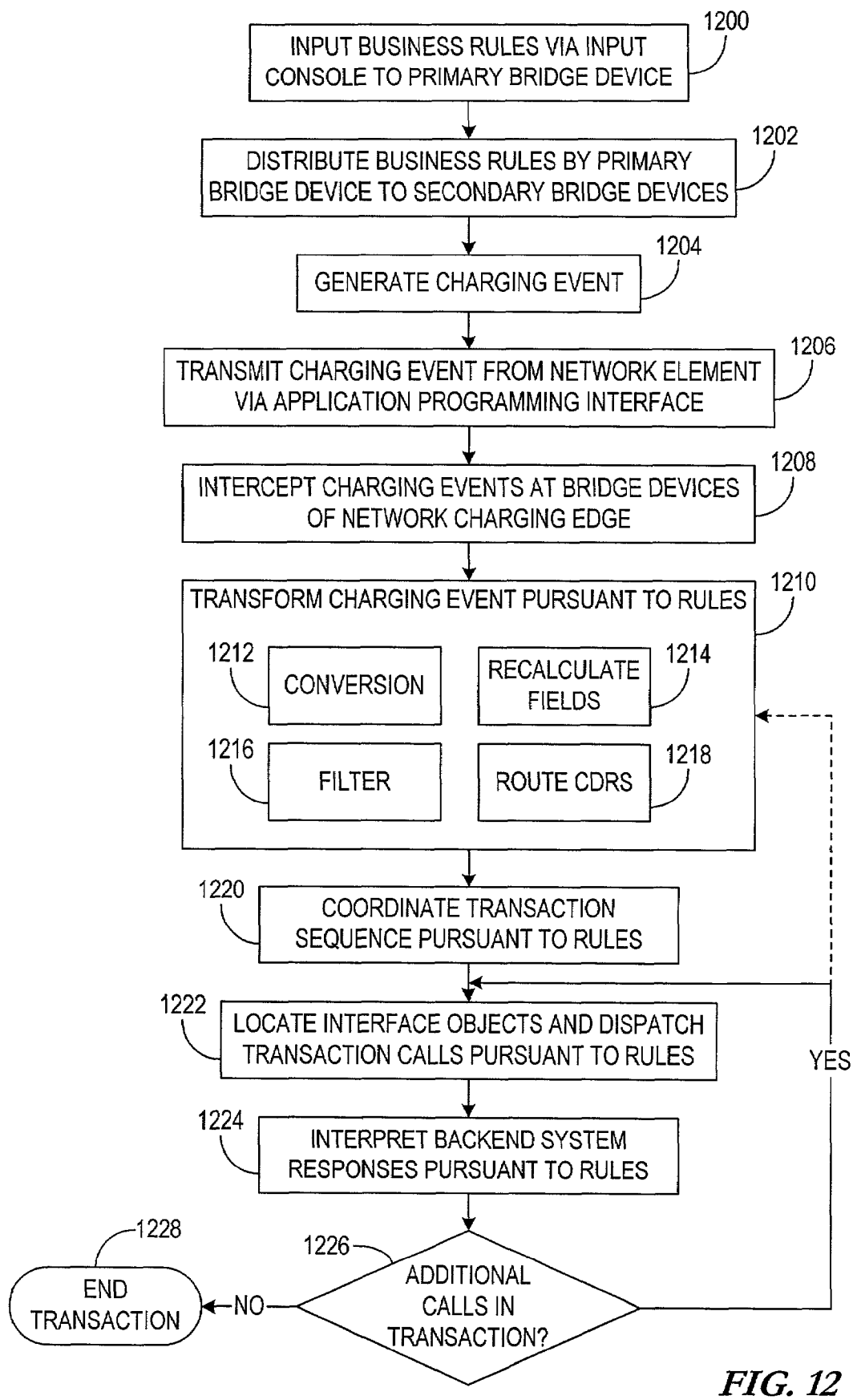
FIG. 12 is a flow diagram of a more particular manner of interfacing network elements in the network domain and elements in an OSS domain.

A more particular, exemplary embodiment of a method for interfacing network elements in the network domain and elements in an OSS domain is provided in FIG. 12. The embodiment represented by, FIG. 12 includes various particular features of the present invention. For example, a networking environment employing multiple bridge devices may include a designated primary bridge device. Business rules are input 1200 to the primary bridge device via any type of input terminal, console, or other input mechanism. Business rules applicable to the entire charging layer are provided to the primary bridge device, and those business rules applicable to one or more secondary bridge devices (if present) are distributed 1202 to the respective secondary bridge devices. Those business rules applicable to the primary bridge device are retained by the primary bridge device.

With the rules being in place, network elements may generate charging events 1204, and transmit 1206 the charging events via an API. The charging events are recognized and intercepted 1208 by the bridge devices of the charging edge that are associated with the transmitting network elements. Where necessary, the bridges transform 1210 the charging event pursuant to the rules at that bridge. As previously described, such transformations are used to format the charging event in any manner that results in a format corresponding to the destination OSS device. For example, this transformation may include data conversion 1212, which may include converting from an input message format to an output message format. The transformations 1210 of charging events may also include the recalculation of fields, as shown by block 1214. This includes, for example, transforming representations of information into a format that is meaningful to the ultimate OSS device destination. More particularly, such a transformation may include transforming a symbolic or numeric URL identifying the service into a textual URL that is useful to a billing system in creating invoices. Another example is the recalculation of data amounts, such as converting a number of bytes transferred into a number of downloads or other unit used by the destination OSS system, or performing mathematical functions on the information to arrive at the appropriate units sought by the destination OSS system.

The transformation 1210 may also include filtering 1216 and routing 1218. Filtering 1216 includes, for example, dropping charging events due to an error in the charging event. The bridge performs this function, thus allowing these erroneous charging events to be dropped before reaching a destination charging/billing system. Further, charging events are often sent to multiple destinations in addition to the charging and billing system, such as to a data warehousing facility. Routing charging events 1218 can also be managed by the bridge 404. Other transformation functions may also be performed in accordance with the invention, and the aforementioned are representative examples of transformations that may be performed.

A charging event, while representing a single message, may involve multiple transactions with various OSS elements. Such an example was described in the example corresponding to FIG. 4. In such a case, the information is extracted by the bridge, and a transaction sequence is coordinated 1220. For example, in a prepaid scenario, the bridge may extract information from the charging event and recognize that calls will need to be made to both a CRM and a prepaid system. The business rules are applied to the information in the charging event in order to arrive at this conclusion. For each particular transaction derived by the rules from the charging event, an interface object is located, and a call to the located interface object is made pursuant to the rules, as shown at block 1222. For example, if a first transaction involves calling a CRM to authorize the service for the user, then a CRM interface object is located using the object configuration rules, and the call may be dispatched to the CRM via the CRM interface object.

The backend systems, i.e., the OSS systems to which the bridge makes calls, may provide responses. These responses may be in the form of status, such as authorized, not authorized, charges imposed, account balances, or any other status or feedback from the backend OSS systems. Such status may not be provided in some instances, such as when the bridge forwards a charging record to a charging and billing system in a postpaid scenario. In that case, the charging and billing system may simply accept the information provided by the bridge, and utilize the information in performing postpaid charging and billing functions. No response may be necessary. However, in other instances such as a prepaid or direct pay scenario, the backend system may provide authorization, status, or other information in response to the call made by the bridge. In such a case, these backend system responses are interpreted 1224 pursuant to the rules. For example, if a CRM system returned a "not authorized" status, rules provided in the bridge direct the bridge to notify the service that the user is not entitled to use the service. Other messages may also be provided in response to such a response, such as a message (e.g., e-mail, SMS, etc.) to the user to provide notification of the authorization failure.

Depending on the information provided in the charging event, and/or depending on responses received from the backend systems, the bridge may need to initiate additional calls to complete the entire charging transaction initiated by the charging event. If additional calls are required as determined at decision block 1226, additional steps are taken to complete the charging transaction. In one embodiment, the transformation 1210 is performed once, which results in a complete set of instructions that define all of the further actions to be taken, and coordinated 1220, to complete that charging transaction. In such an embodiment, the determination 1226 that additional calls are present in the transaction will return processing to block 1222 to locate the next interface objects in the sequence to dispatch transaction calls and interpret 1224 backend system responses. In otherwords, in such an embodiment, the transformation 1210 is performed once for the charging transaction, and the resulting transformed instructions determine the remaining actions for any further calls associated with the charging transaction.

In accordance with an alternative embodiment, the particular responses from called devices may be further transformed 1210. Those received responses may thus be subjected to the transformation rules, as illustrated by the alternative dashed line returning from decision block 1226 to the transformation block 1210. In this embodiment, when additional calls are associated with the charging transaction, additional transformations 1210, transaction sequence coordinations 1220, interface object locations and transaction calls 1222, and backend system response interpretations 1224 may be required. For example, in the examples described in connection with FIGS. 6 and 7, five different calls were initiated by the bridge, including calls A, B, C, D, and E. When no additional calls are required for the charging transaction, the transaction ends 1228.

The Intelligent Charging Edge described herein provides extensive flexibility in the exchange of information between the network and OSS domains. The ICE allows for a variety of different types of network elements to communicate effectively with a variety of different types of charging and billing elements, and allows the introduction of new network and OSS elements to be accomplished more easily and efficiently. Charging events originating from various network elements are effectively managed by the ICE layer, even where multiple network elements create different charging records associated with a particular session or call. As networks continue to migrate towards all-IP networks, a greater emphasis will be placed on coordinating and managing charging information originating from multiple network elements, yet associated with a single session. The Intelligent Charging Edge of the present invention can manage such situations where multiple network elements generate charging event information associated with a common session or call. An example illustrating such a situation is described in connection with FIG. 13.

Figure 13:
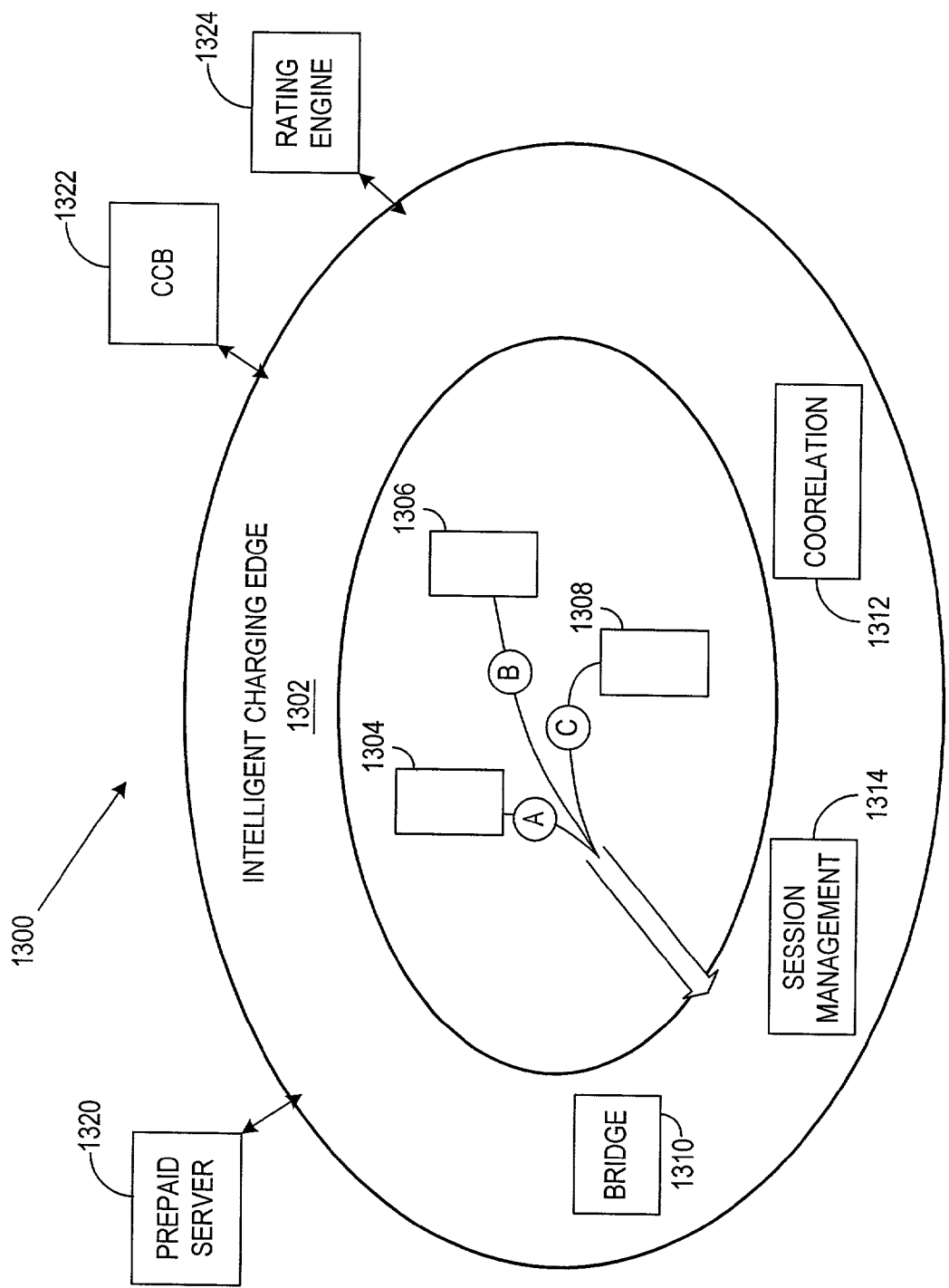
FIG. 13 is a block diagram illustrating one embodiment of a charging edge utilized in connection with charging information generated by multiple network elements.

FIG. 13 is a block diagram of an exemplary network 1300 employing an intelligent charging edge 1302 to manage a session where multiple network elements generate different segments of a collective charging event. For purposes of explanation and not of limitation, the example of FIG. 13 is described in terms of a voice-over-IP call. It should be recognized that the example of FIG. 13 is equally applicable to any type of transmission, whether voice, data, images, video, etc.

In this example, multiple network elements 1304, 1306, 1308 are each involved in the call, and each may generate charging information for that call. For example, in the context of a GPRS network or third generation (3G) network, charging information may be generated by one network element regarding the volume of traffic communicated in the voice-over-IP call. Another network element may track the duration of the call. Still another network element may track the number of messages associated with the call. Each of these network element functions may thus produce information that may in some combination collectively serve as the charging event.

In accordance with the invention, the management of the various charging information is accomplished through application of the charging edge rules previously described. In accordance with one embodiment of the invention, these rules are provided in one or more ICE bridges 1310. These rules determine what actions are to be taken for each of the charging information segments produced by the multiple network elements involved with the session. For example, if network elements 1304, 1306, 1308 each generate charging information for the same call, the rules will determine how to treat this charging information relative to the ultimate charging event that may be utilized by one or more of the charging elements such as the prepaid server 1320, CCB 1322, and rating engine 1324. One rule may, for example, indicate that out of the information A, B, and C provided by network elements 1304, 1306, and 1308 respectively, only the information B and C will be utilized in the ultimate charging event, and the information A will be dropped. A business model, reflected in the business rules, will dictate such action. A different rule may, for example, determine that certain subscribers will be charged for all chargeable activity, in which case the charging information from each of the network elements 1304, 1306, 1308 can be independently handled by the ICE rather than gathering all of the information and making collective decisions. Again, the rules provided in connection with the ICE can effectively carry out such decisions and resulting actions.

Yet another rule may, for example, dictate that one or more charging information records from the various network elements be sent to a correlation element 1312, such as a charging gateway, to correlate the information in the charging information records. Alternatively, or in addition to utilizing the correlation element 1312, the rule(s) may dictate that a session management element 1314 be called upon. A session management element 1314 can monitor the events of the call, and thereby know what the user or subscriber is doing. The bridge 1310 can work closely with such correlation elements 1312 and session management elements 1314 to effectively manipulate the charging information from the various network elements into a desired charging event. In these instances, the correlation element(s) 1312 and session management element(s) 1314 in effect form part of the intelligent charging edge in this context. The bridge 1310 can work in connection with other elements forming part of the intelligent charging edge in an analogous manner.

For example, the bridge 1310 can determine whether or not correlation is even required for a particular session. In a more particular example, consider a WAP transaction. At least two different records may be produced in a WAP transaction, including a record from a GPRS network indicating the number of bytes transferred during the session, and another record from a WAP gateway indicating the URL that was visited. If a particular operator was only concerned with the URL for charging purposes, that operator may want to drop the record from the GPRS network. This can be accomplished using the rules associated with the intelligent charging edge 1302. On the other hand, an operator may want to correlate the two records (i.e., number of bytes transferred and the URL visited) to arrive at some charge taking both records into consideration. Again, the rules associated with the intelligent charging edge can effect this desire by, for example, applying rules to directly effect such a correlation, or instead forwarding the records to the correlation element 1312. Accordingly, the charging edge according to the invention provides the ability to coordinate potential charging information from multiple network elements, to ultimately produce a desired charging event that can be used by any one or more of the OSS elements such as charging elements 1320, 1322, 1324.

It should be recognized that the aforementioned embodiments are representative examples of the various intelligent charging edge principles described herein, and the invention is not limited to these illustrated embodiments.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any sub-components or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. From the foregoing description of the illustrated embodiments, those of ordinary skill in the art will readily appreciate the applicability of the invention in any comparable network environment. Accordingly, the scope of the present invention should not be limited by the particular embodiments discussed above, but should be defined only by the claims set forth below and equivalents thereof.

What is claimed is:

1. A method comprising:
    coupling a plurality of bridge modules to form a logical network layer between one or more network elements providing billable services and one or more charging elements;
    receiving charging events at the bridge modules, wherein the charging events record details of the billable services; and
    managing charging transactions at a network between the network elements and their respective charging elements via the bridge modules through the application of rules to the charging transaction initiated by corresponding charging events, wherein each of the bridge modules is configured with a subset of the rules assigned to the services managed by that bridge module, and one of the bridge modules is designated as a primary bridge module to receive the rules and distribute the subsets of rules to the remaining bridge modules.

2. The method as in claim 1 further comprising generating and transmitting the charging events by the network elements providing the billable services, wherein the charging events comprise service use parameters used by the charging elements.

3. The method as in claim 1, further comprising entering the rules at a console coupled to the primary bridge module.

4. The method as in claim 1, further comprising:
    implementing an application programming interface (API) at each of the network elements providing billable services to interface each of the respective network elements to the one or more bridge modules; and
    generating and transmitting the charging events by the network elements providing the billable services, wherein transmitting the charging events comprises transmitting XML-formatted charging events pursuant to the API.

5. The method as in claim 1, wherein receiving charging events comprises intercepting the charging events dispatched by the network elements to the charging elements.

6. The method as in claim 1, wherein managing charging transactions comprises applying the rules to transform the charging events to a format recognizable by targeted charging elements.

7. The method as in claim 6, wherein applying the rules to transform the charging events comprises converting the charging events from a first format to a second format.

8. The method as in claim 6, wherein applying the rules to transform the charging events comprises filtering the charging events to prevent transmission of particular ones of the charging events to the charging elements.

9. The method as in claim 6, wherein applying the rules to transform the charging events comprises recalculating fields of the charging events to present the fields in units utilized in the charging elements.

10. The method as in claim 6, wherein applying the rules to transform the charging events comprises routing the charging events to multiple destinations.

11. The method as in claim 6, further comprising transmitting the transformed charging events via interface objects corresponding to respective charging elements.

12. The method as in claim 11, further comprising directing the transformed charging events to the interface objects corresponding to targeted charging elements based on the rules and the transformed charging events.

13. The method as in claim 12, wherein directing the transformed charging events further comprises applying the rules to the transformed charging events to identify addresses of the interface objects corresponding to the targeted charging elements.

14. The method as in claim 1, wherein managing charging transactions comprises selecting an interface object for communicating with a corresponding charging element, wherein selecting an interface object comprises identifying one of a plurality of the interface objects as determined by object configuration rules.

15. The method as in claim 1, wherein managing charging transactions comprises performing a plurality of transaction operations with a plurality of the charging elements in a sequence dictated by the rules.

16. The method as in claim 15, wherein performing a plurality of transaction operations with a plurality of the charging elements comprises applying the rules to responsive messages from at least one of the charging elements to perform one or more of the transaction operations.

17. The method as in claim 1, wherein managing charging transactions comprises coordinating one or more communications with the charging elements to carry out the charging transaction.

18. The method as in claim 17, wherein coordinating the communications with the charging elements comprises transmitting a first call to a first charging element in response to applying the rules to the charging transaction initiated by the corresponding charging event.

19. The method as in claim 18, wherein coordinating the communications with the charging elements further comprises receiving a response to the first call from the first charging element, and transmitting a second call to a second charging element in response to applying the rules to the response to the first call.

20. An apparatus, comprising:
a processor configured with executable instructions that:
couple one or more bridge modules to form a logical network layer between one or more network elements providing billable services and one or more charging elements;
receive charging events at the one or more bridge modules, wherein the charging events record details of the billable services; and
manage charging transactions at the network between the network elements and their respective charging elements via the one or more bridge modules through the application of rules to the charging transaction initiated by corresponding charging events, wherein managing the charging transactions comprises applying the rules to transform the charging events to a format recognizable by targeted charging elements.

21. The apparatus as in claim 20, wherein the executable instructions further cause the apparatus to generate and transmit the charging events by the network elements providing the billable services, wherein the charging events comprise service use parameters used by the charging elements.

22. The apparatus as in claim 20, wherein the executable instructions further:
implement an application programming interface (API) at each of the network elements providing billable services to interface each of the respective network elements to the one or more bridge modules; and
generate and transmit the charging events by the network elements providing the billable services, wherein transmitting the charging events comprises transmitting XML-formatted charging events pursuant to the API.

23. The apparatus as in claim 20, wherein receiving charging events comprises intercepting the charging events dispatched by the network elements to the charging elements.

24. The apparatus as in claim 20, wherein managing charging transactions comprises applying the rules to transform the charging events to a format recognizable by targeted charging elements.

25. The apparatus as in claim 24, wherein applying the rules to transform the charging events comprises converting the charging events from a first format to a second format.

26. The apparatus as in claim 24, wherein applying the rules to transform the charging events comprises filtering the charging events to prevent transmission of particular ones of the charging events to the charging elements.

27. The apparatus as in claim 24, wherein applying the rules to transform the charging events comprises recalculating fields of the charging events to present the fields in units utilized in the charging elements.

28. The apparatus as in claim 24, wherein applying the rules to transform the charging events comprises routing the charging events to multiple destinations.

29. The apparatus as in claim 24, wherein the executable instructions further transmit the transformed charging events via interface objects corresponding to respective charging elements.

30. The apparatus as in claim 29, wherein the executable instructions further direct the transformed charging events to the interface objects corresponding to targeted charging elements based on the rules and the transformed charging events.

31. The apparatus as in claim 30, wherein directing the transformed charging events further comprises applying the rules to the transformed charging events to identify addresses of the interface objects corresponding to the targeted charging elements.

32. The apparatus as in claim 20, wherein managing charging transactions comprises selecting an interface object for communicating with a corresponding charging element, wherein selecting an interface object comprises identifying one of a plurality of the interface objects as determined by object configuration rules.

33. The apparatus as in claim 20, wherein managing charging transactions comprises performing a plurality of transaction operations with a plurality of the charging elements in a sequence dictated by the rules.

34. The apparatus as in claim 33, wherein performing a plurality of transaction operations with a plurality of the charging elements comprises applying the rules to responsive messages from at least one of the charging elements to perform one or more of the transaction operations.

35. The apparatus as in claim 20, wherein managing charging transactions comprises coordinating one or more communications with the charging elements to carry out the charging transaction.

36. The apparatus as in claim 35, wherein coordinating the communications with the charging elements comprises transmitting a first call to a first charging element in response to applying the rules to the charging transaction initiated by the corresponding charging event.

37. The apparatus as in claim 36, wherein coordinating the communications with the charging elements further comprises receiving a response to the first call from the first charging element, and transmitting a second call to a second charging element in response to applying the rules to the response to the first call.

38. The apparatus as in claim 20, wherein the executable instructions further receive the rules at a console coupled to the primary bridge module.

39. A computer-readable storage medium encoded with instructions that, when executed by an apparatus, perform:
coupling a plurality of bridge modules to form a logical network layer between one or more network elements providing billable services and one or more charging elements;
receiving charging events at the bridge modules, wherein the charging events record details of the billable services; and
managing charging transactions at a network between the network elements and their respective charging elements via the bridge modules through the application of rules to the charging transaction initiated by corresponding charging events, wherein each of the bridge modules is configured with a subset of the rules assigned to the services managed by that bridge module, and one of the bridge modules is designated as a primary bridge module to receive the rules and distribute the subsets of rules to the remaining bridge modules.

40. The computer-readable storage medium as in claim 39, wherein the executable instructions further cause the apparatus to generate and transmit the charging events by the network elements providing the billable services, wherein the charging events comprise service use parameters used by the charging elements.

41. The computer-readable storage medium as in claim 39, wherein the executable instructions further cause the apparatus to:
implement an application programming interface (API) at each of the network elements providing billable services to interface each of the respective network elements to the one or more bridge modules; and generate and transmit the charging events by the network elements providing the billable services, wherein transmitting the charging events comprises transmitting XML-formatted charging events pursuant to the API.

42. The computer-readable storage medium as in claim 39, wherein receiving charging events comprises intercepting the charging events dispatched by the network elements to the charging elements.

43. The computer-readable storage medium as in claim 39, wherein managing charging transactions comprises applying the rules to transform the charging events to a format recognizable by targeted charging elements.

44. The computer-readable storage medium as in claim 43, wherein applying the rules to transform the charging events comprises converting the charging events from a first format to a second format.

45. The computer-readable storage medium as in claim 43, wherein applying the rules to transform the charging events comprises filtering the charging events to prevent transmission of particular ones of the charging events to the charging elements.

46. The computer-readable storage medium as in claim 43, wherein applying the rules to transform the charging events comprises recalculating fields of the charging events to present the fields in units utilized in the charging elements.

47. The computer-readable storage medium as in claim 43, wherein applying the rules to transform the charging events comprises routing the charging events to multiple destinations.

48. The computer-readable storage medium as in claim 43, wherein the executable instructions further cause the apparatus to transmit the transformed charging events via interface objects corresponding to respective charging elements.

49. The computer-readable storage medium as in claim 48 wherein the executable instructions further cause the apparatus to direct the transformed charging events to the interface objects corresponding to targeted charging elements based on the rules and the transformed charging events.

50. The computer-readable storage medium as in claim 49, wherein directing the transformed charging events further comprises applying the rules to the transformed charging events to identify addresses of the interface objects corresponding to the targeted charging elements.

51. The computer-readable storage medium as in claim 39, wherein managing charging transactions comprises selecting an interface object for communicating with a corresponding charging element, wherein selecting an interface object comprises identifying one of a plurality of the interface objects as determined by object configuration rules.

52. The computer-readable storage medium as in claim 39, wherein managing charging transactions comprises performing a plurality of transaction operations with a plurality of the charging elements in a sequence dictated by the rules.

53. The computer-readable storage medium as in claim 52, wherein performing a plurality of transaction operations with a plurality of the charging elements comprises applying the rules to responsive messages from at least one of the charging elements to perform one or more of the transaction operations.

54. The computer-readable storage medium as in claim 39, wherein managing charging transactions comprises coordinating one or more communications with the charging elements to carry out the charging transaction.

55. The computer-readable storage medium as in claim 43, wherein managing charging transactions comprises selecting an interface object for communicating with a corresponding charging element, wherein selecting an interface object comprises identifying one of a plurality of the interface objects as determined by object configuration rules.

56. The computer-readable storage medium as in claim 43, wherein managing charging transactions comprises performing a plurality of transaction operations with a plurality of the charging elements in a sequence dictated by the rules.

57. The computer-readable storage medium as in claim 56, wherein performing a plurality of transaction operations with a plurality of the charging elements comprises applying the rules to responsive messages from at least one of the charging elements to perform one or more of the transaction operations.

58. The computer-readable storage medium as in claim 43, wherein managing charging transactions comprises coordinating one or more communications with the charging elements to carry out the charging transaction.

* * * * *